Figure 6:
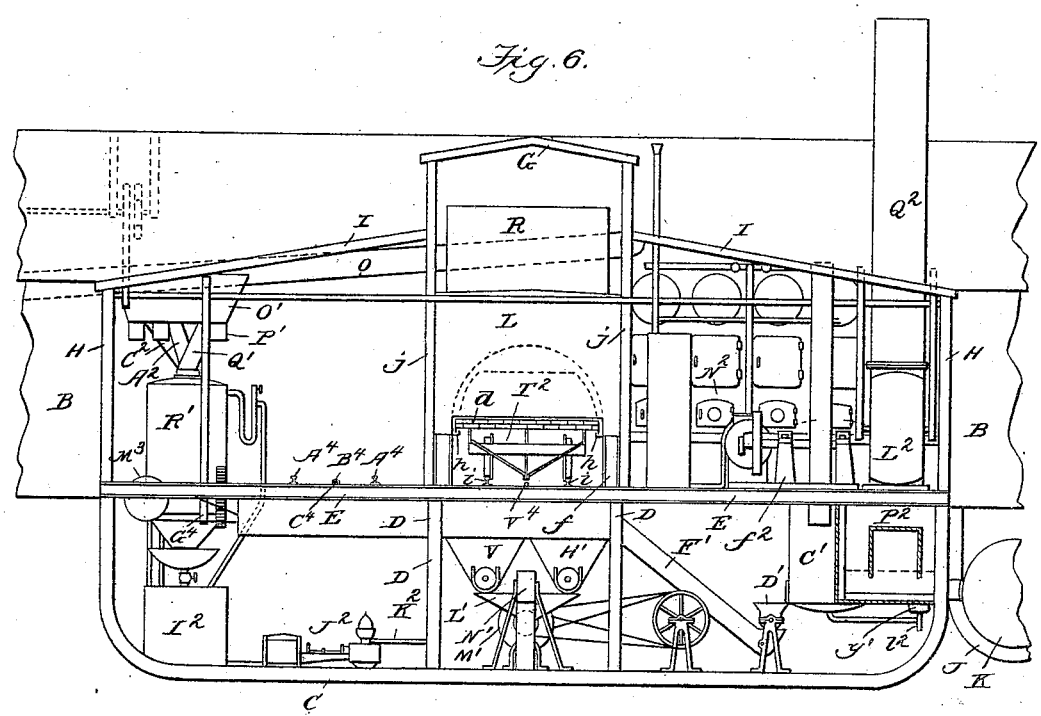

(No Model.) 25 Sheets—Sheet 1.
J. C. ANDERSON.
METHOD OF AND APPARATUS FOR TREATMENT AND REDUCTION OF GARBAGE.
No. 539,245. Patented May 14, 1895.
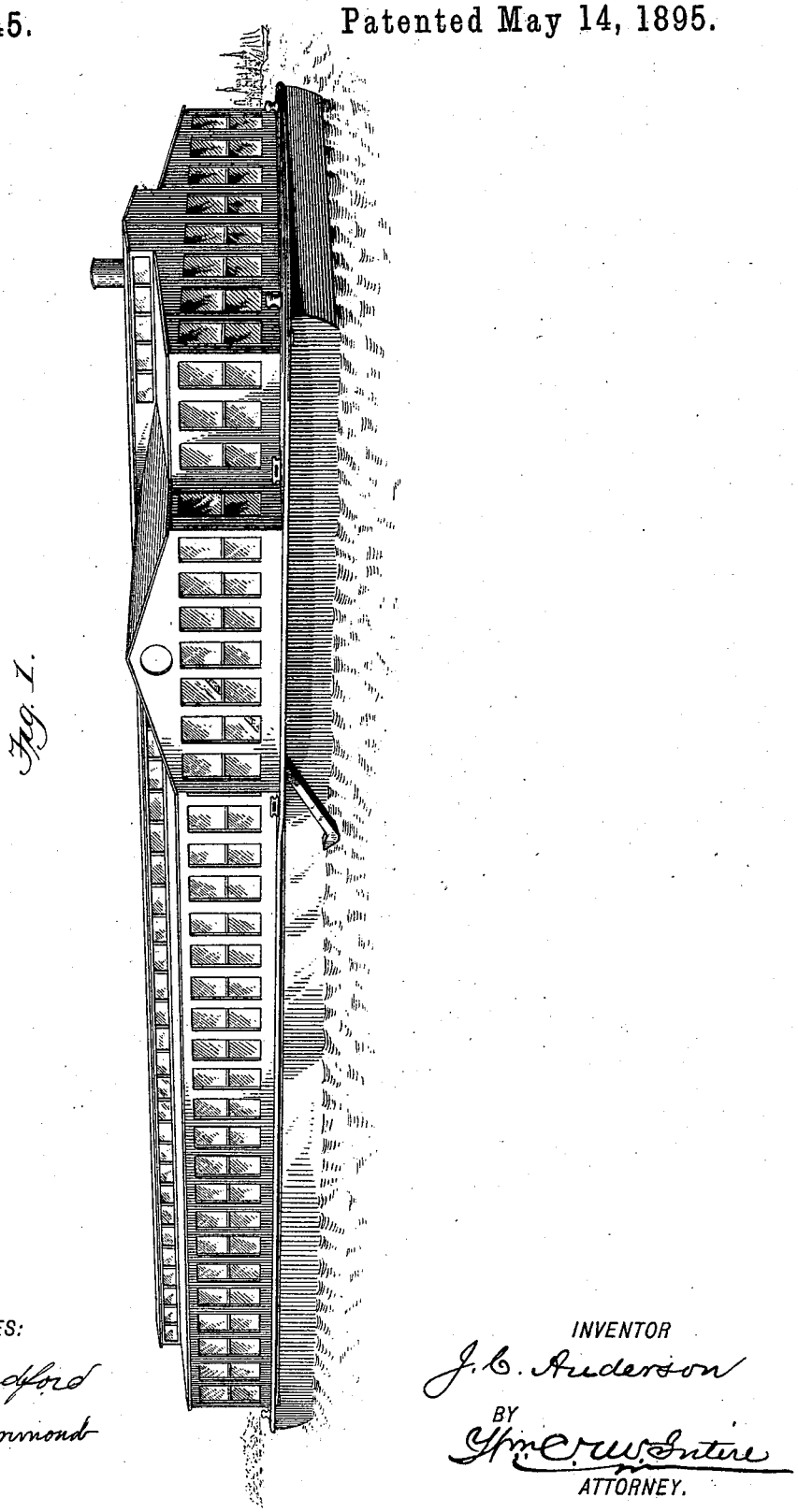
WITNESSES:
Edwin L. Bradford
N. Curtis Hammond
INVENTOR
J. C. Anderson
BY
Wm. C. McIntire
ATTORNEY.

(No Model.) 25 Sheets—Sheet 2.
J. C. ANDERSON.
METHOD OF AND APPARATUS FOR TREATMENT AND REDUCTION OF GARBAGE.
No. 539,245. Patented May 14, 1895.
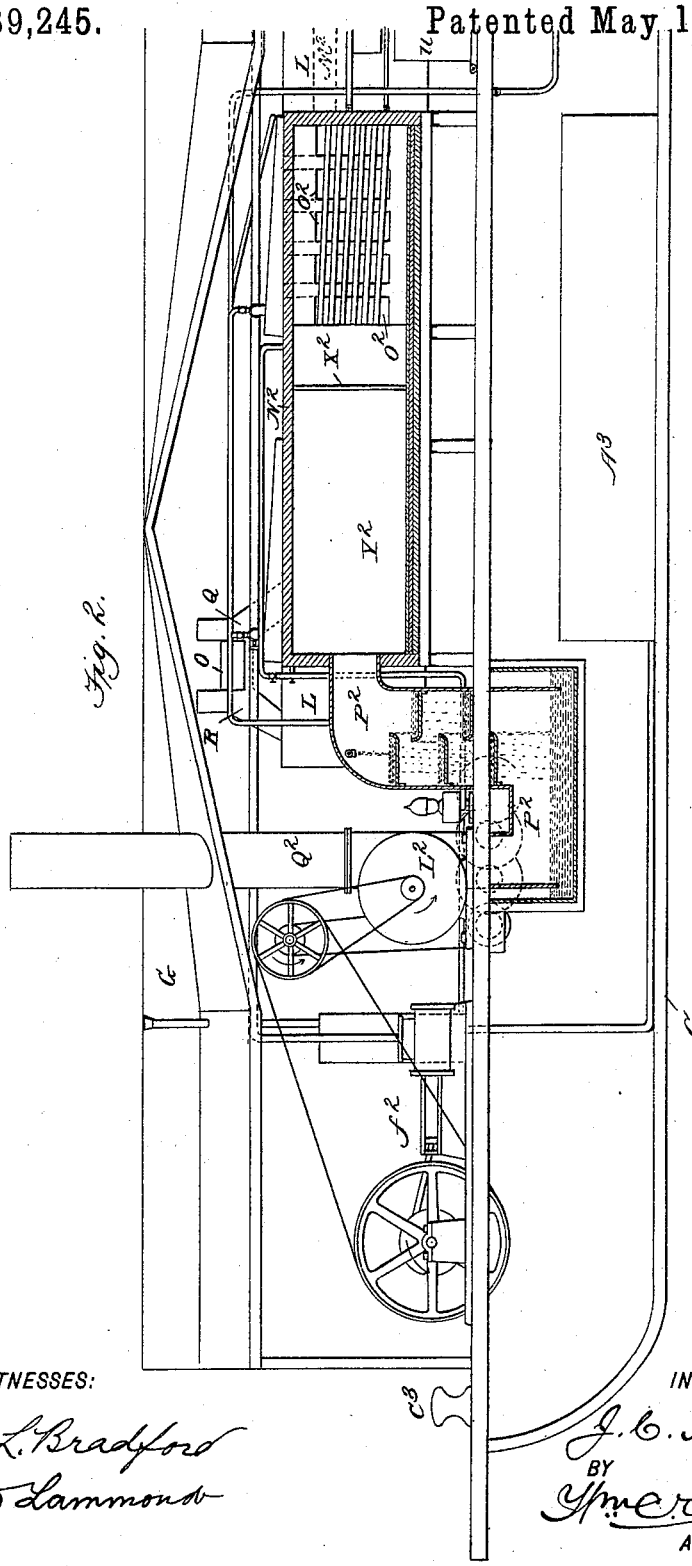
WITNESSES:
Edwin L. Bradford
N. Curtis Lammond
INVENTOR
J. C. Anderson
BY
ATTORNEY.

(No Model.) 25 Sheets—Sheet 3.
J. C. ANDERSON.
METHOD OF AND APPARATUS FOR TREATMENT AND REDUCTION OF GARBAGE.
No. 539,245. Patented May 14, 1895.
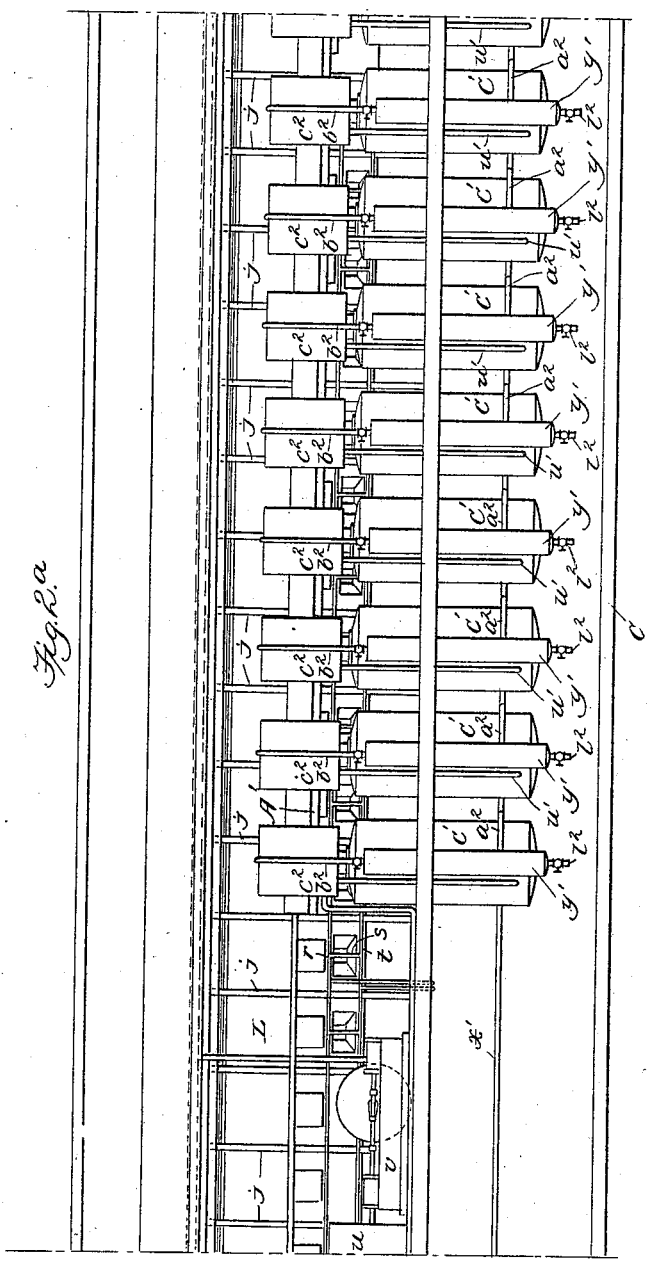
WITNESSES:
Edwin L. Bradford
N. Curtis Lammond
INVENTOR
J. C. Anderson
BY
ATTORNEY.

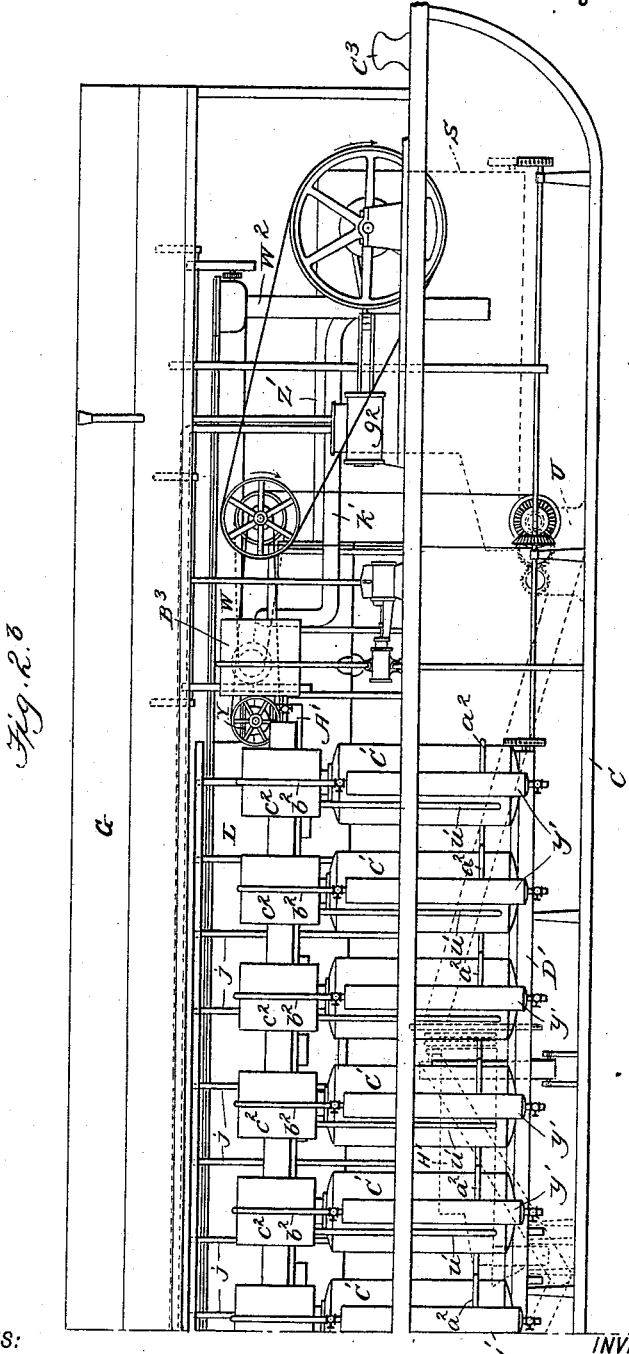

(No Model.) 25 Sheets—Sheet 5.
J. C. ANDERSON.
METHOD OF AND APPARATUS FOR TREATMENT AND REDUCTION OF GARBAGE.
No. 539,245. Patented May 14, 1895.
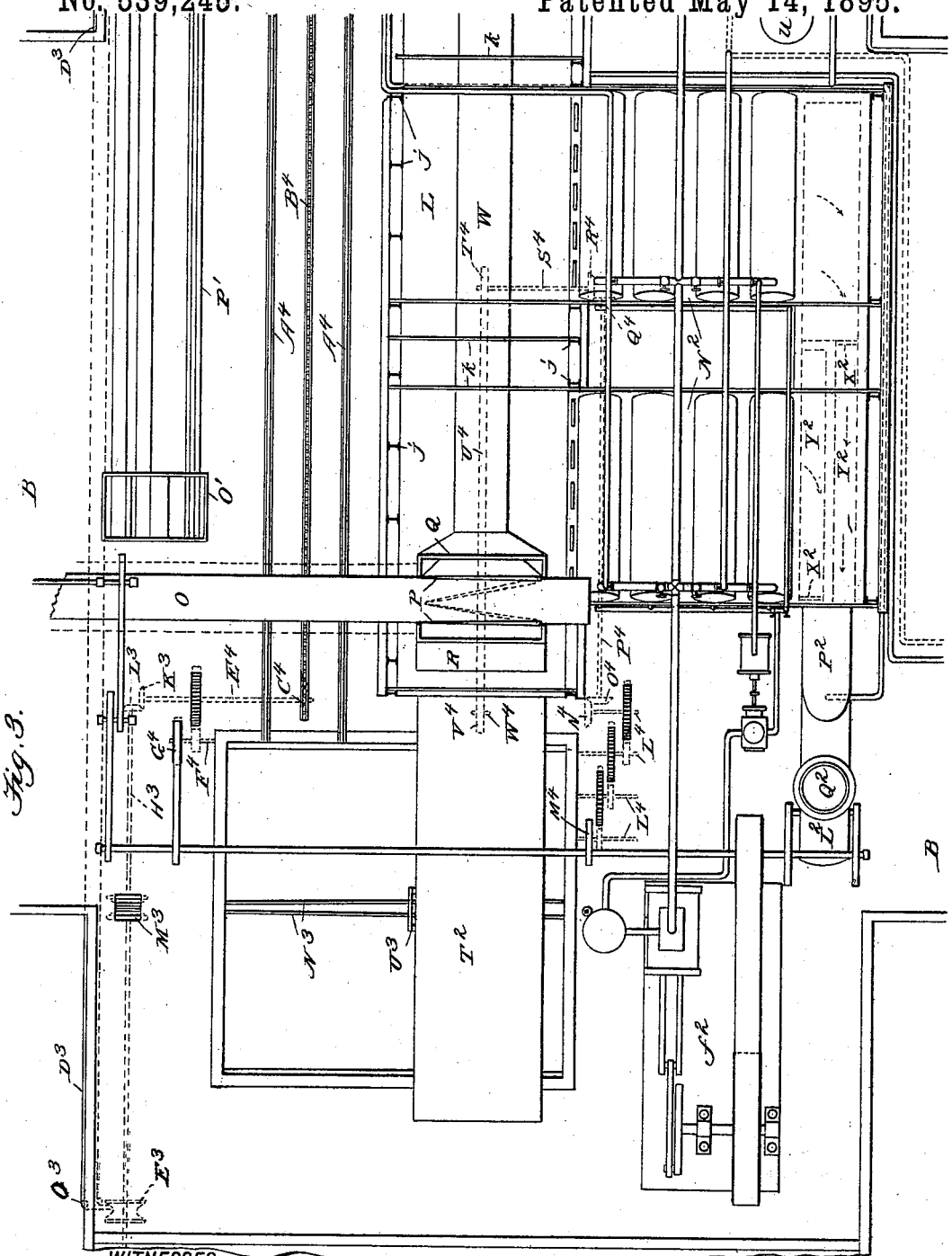
WITNESSES: INVENTOR
Edwin L. Bradford J. C. Anderson
N. Curtis Lammond BY
 ATTORNEY.

(No Model.) 25 Sheets—Sheet 6.
J. C. ANDERSON.
METHOD OF AND APPARATUS FOR TREATMENT AND REDUCTION OF GARBAGE.
No. 539,245. Patented May 14, 1895.
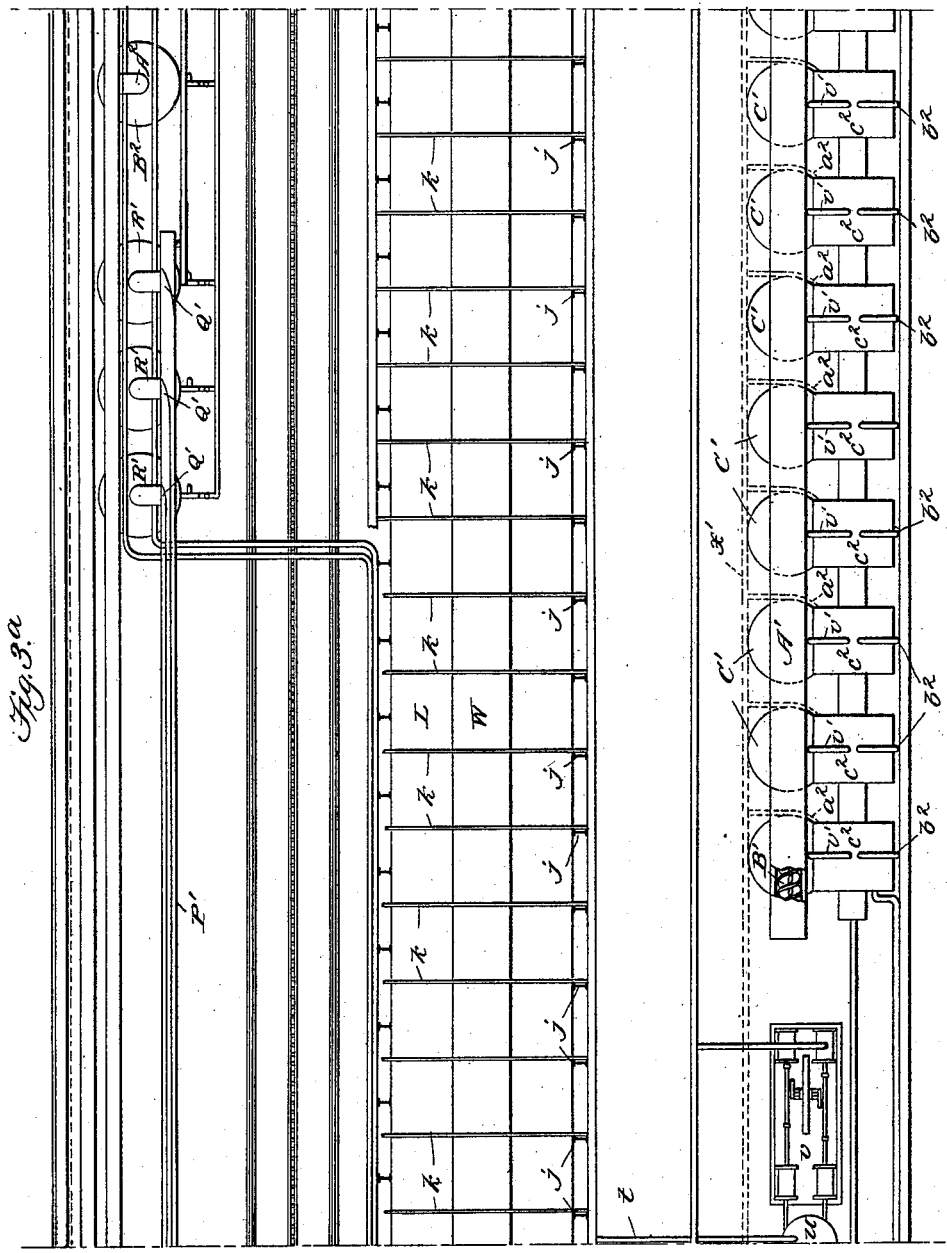
WITNESSES:
Edwin L. Bradford
N. Curtis Lammond
INVENTOR
J. C. Anderson
BY
Wm C. McIntire
ATTORNEY.

(No Model.) 25 Sheets—Sheet 7.
J. C. ANDERSON.
METHOD OF AND APPARATUS FOR TREATMENT AND REDUCTION OF GARBAGE.
No. 539,245. Patented May 14, 1895.
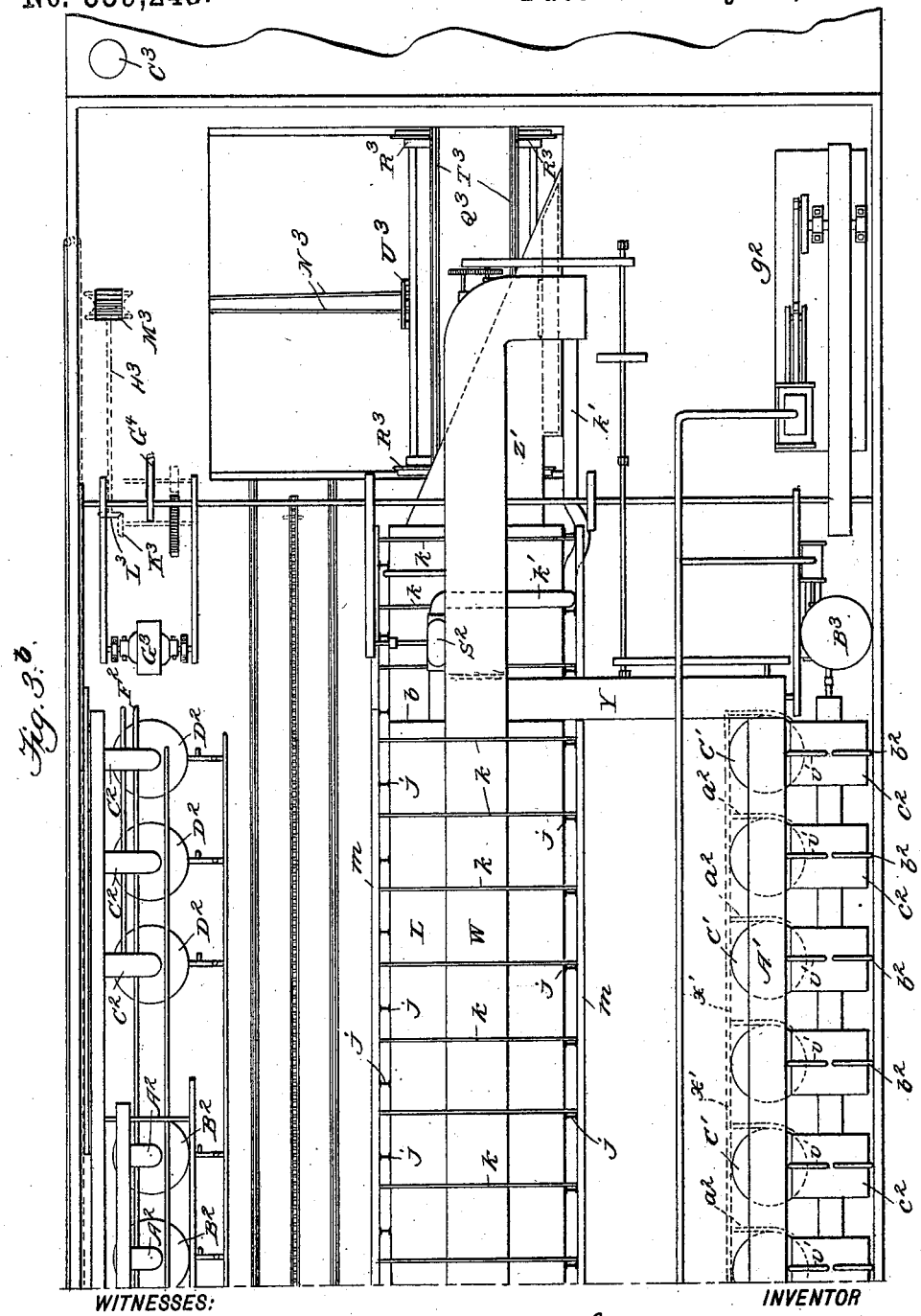

(No Model.) 25 Sheets—Sheet 8.
J. C. ANDERSON.
METHOD OF AND APPARATUS FOR TREATMENT AND REDUCTION OF GARBAGE.
No. 539,245. Patented May 14, 1895.
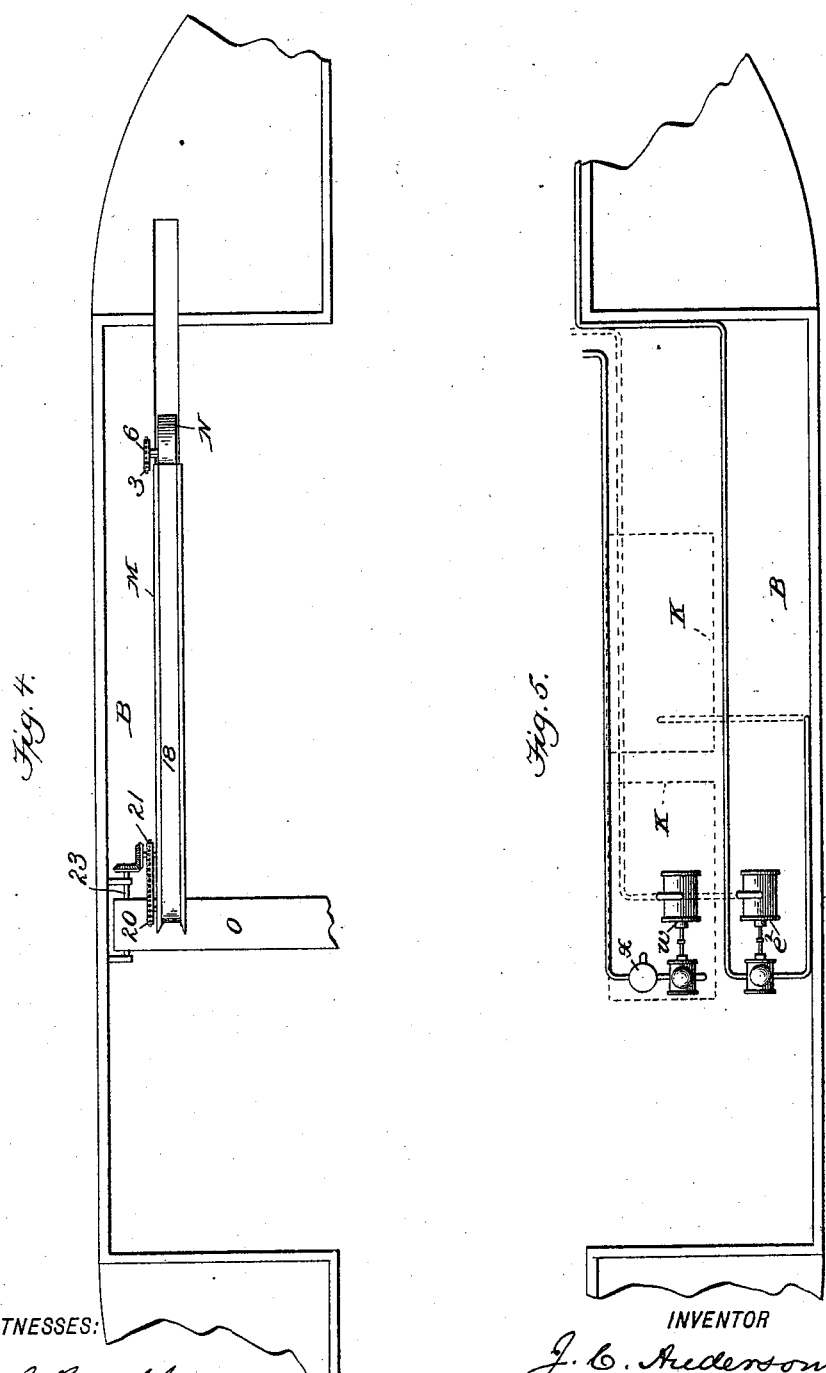
WITNESSES:
Edwin L. Bradford
N. Curtis Lammond
INVENTOR
J. C. Anderson
BY
Wm C. ...
ATTORNEY.

(No Model.) 25 Sheets—Sheet 9.

J. C. ANDERSON.
METHOD OF AND APPARATUS FOR TREATMENT AND REDUCTION OF GARBAGE.

No. 539,245. Patented May 14, 1895.

WITNESSES:
INVENTOR (No Model.) 25 Sheets—Sheet 10.
J. C. ANDERSON.
METHOD OF AND APPARATUS FOR TREATMENT AND REDUCTION OF GARBAGE.

No. 539,245. Patented May 14, 1895.

WITNESSES: INVENTOR (No Model.)　　　　　　　　　　　　　　25 Sheets—Sheet 11.
J. C. ANDERSON.
METHOD OF AND APPARATUS FOR TREATMENT AND REDUCTION OF GARBAGE.
No. 539,245.　　　　　　　　Patented May 14, 1895.
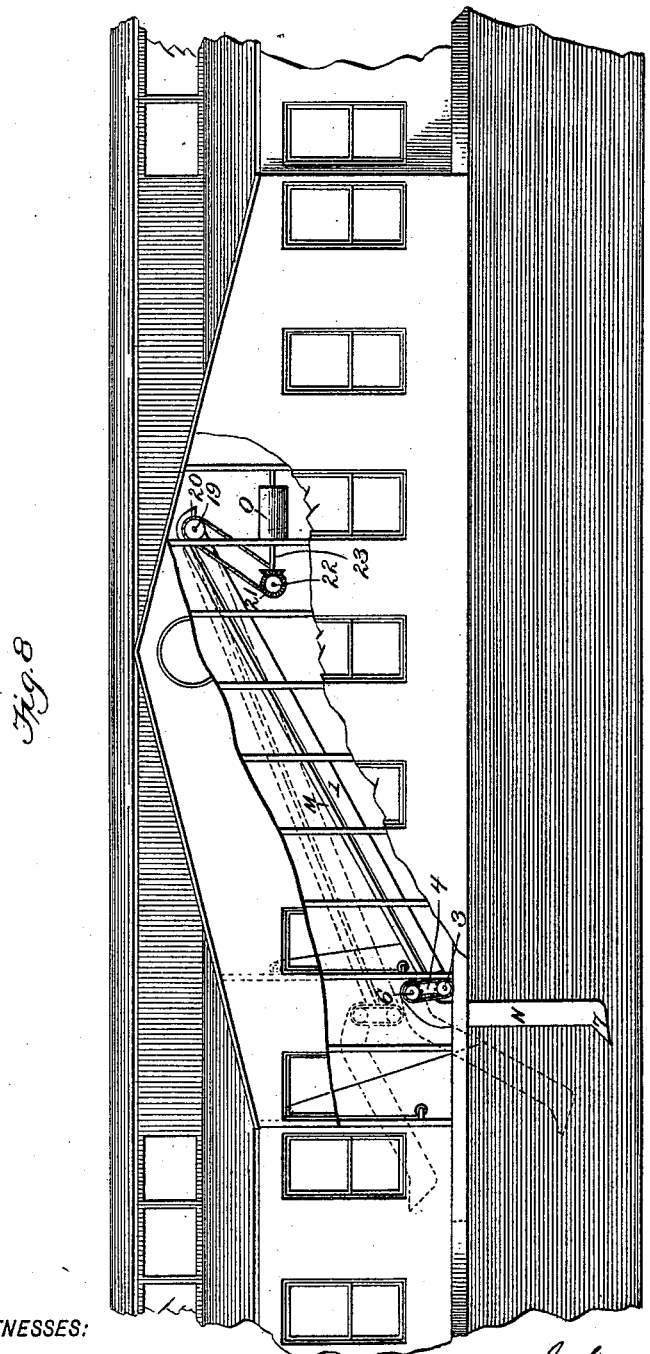
WITNESSES:　　　　　　　　　　　　　　　　INVENTOR
*Edwin L. Bradford*　　　　　　　　　　　*J. C. Anderson*
*N. Curtis Lammond*　　　　　　　　　　BY
　　　　　　　　　　　　　　　　　　　　　ATTORNEY.

(No Model.)
25 Sheets—Sheet 12.
J. C. ANDERSON.
METHOD OF AND APPARATUS FOR TREATMENT AND REDUCTION OF GARBAGE.
No. 539,245.
Patented May 14, 1895.
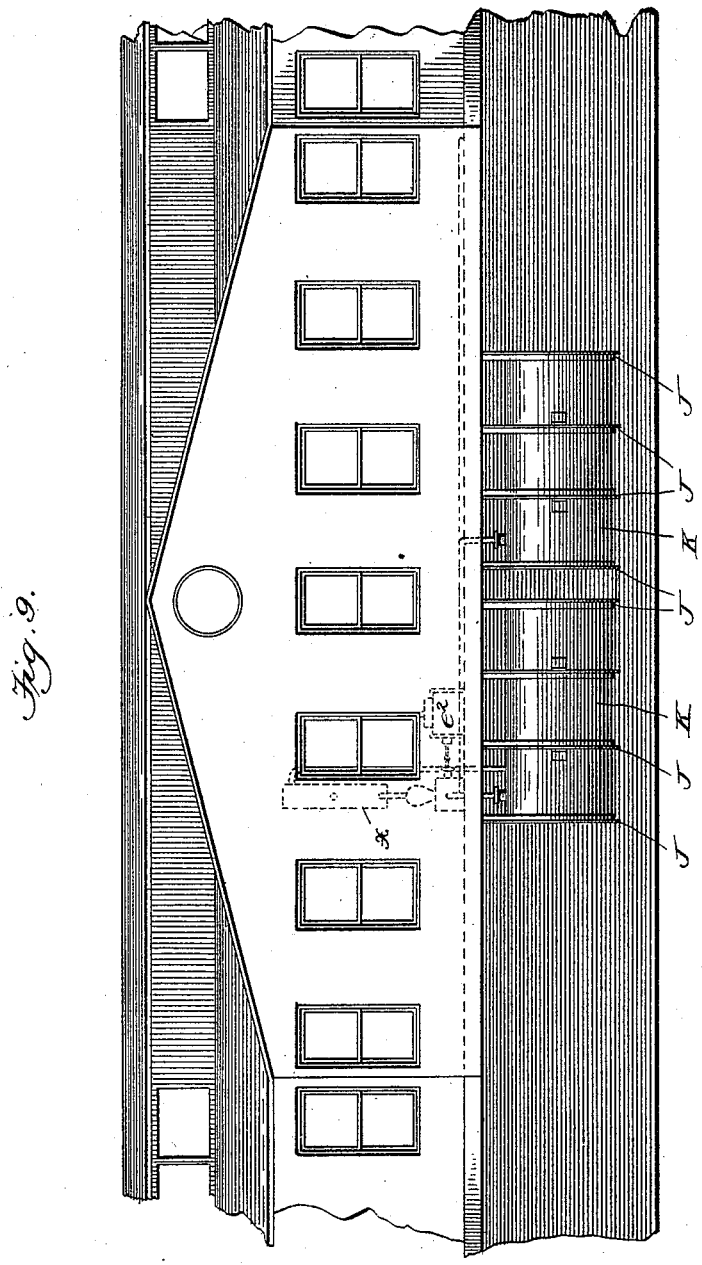
WITNESSES:
INVENTOR
ATTORNEY.

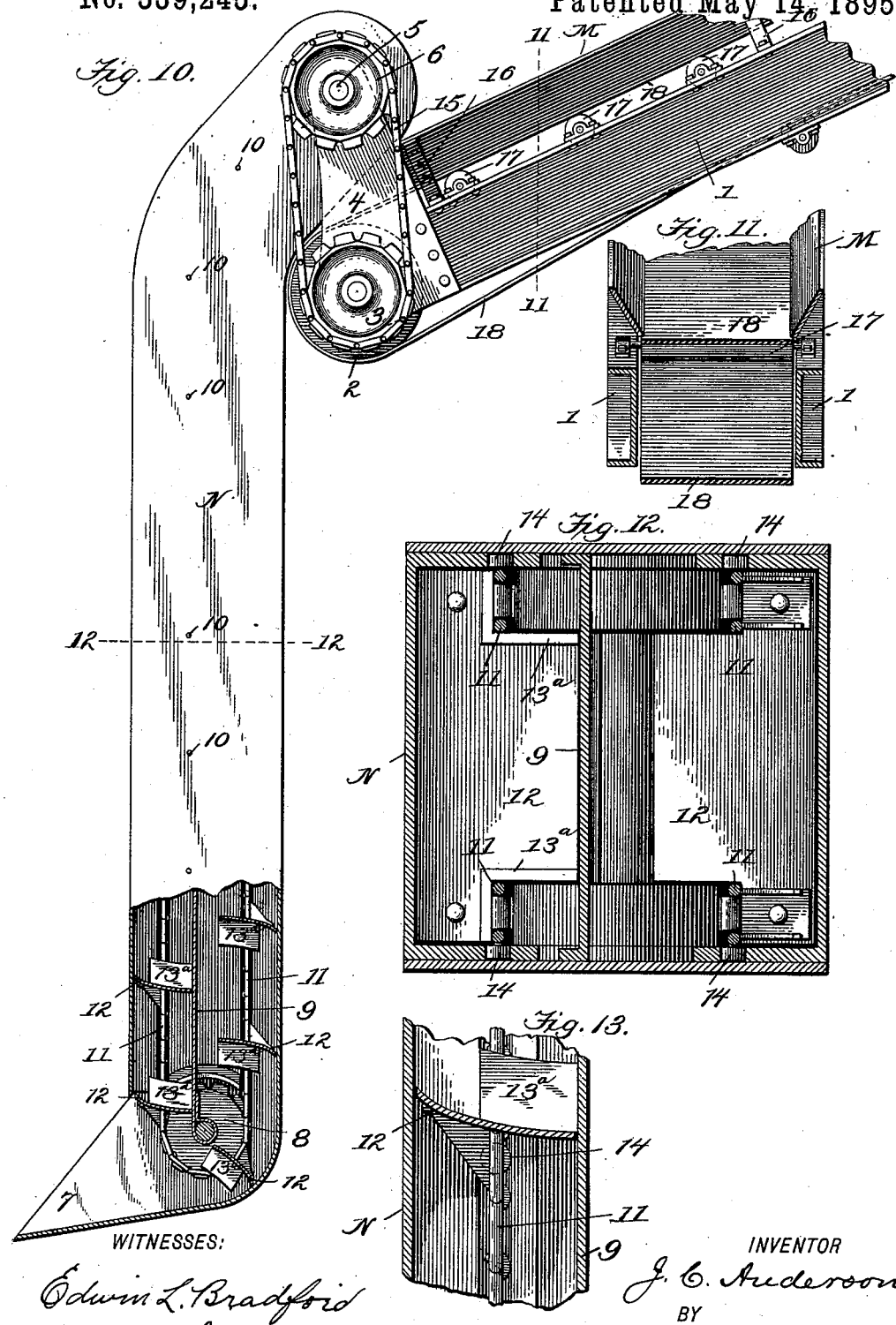

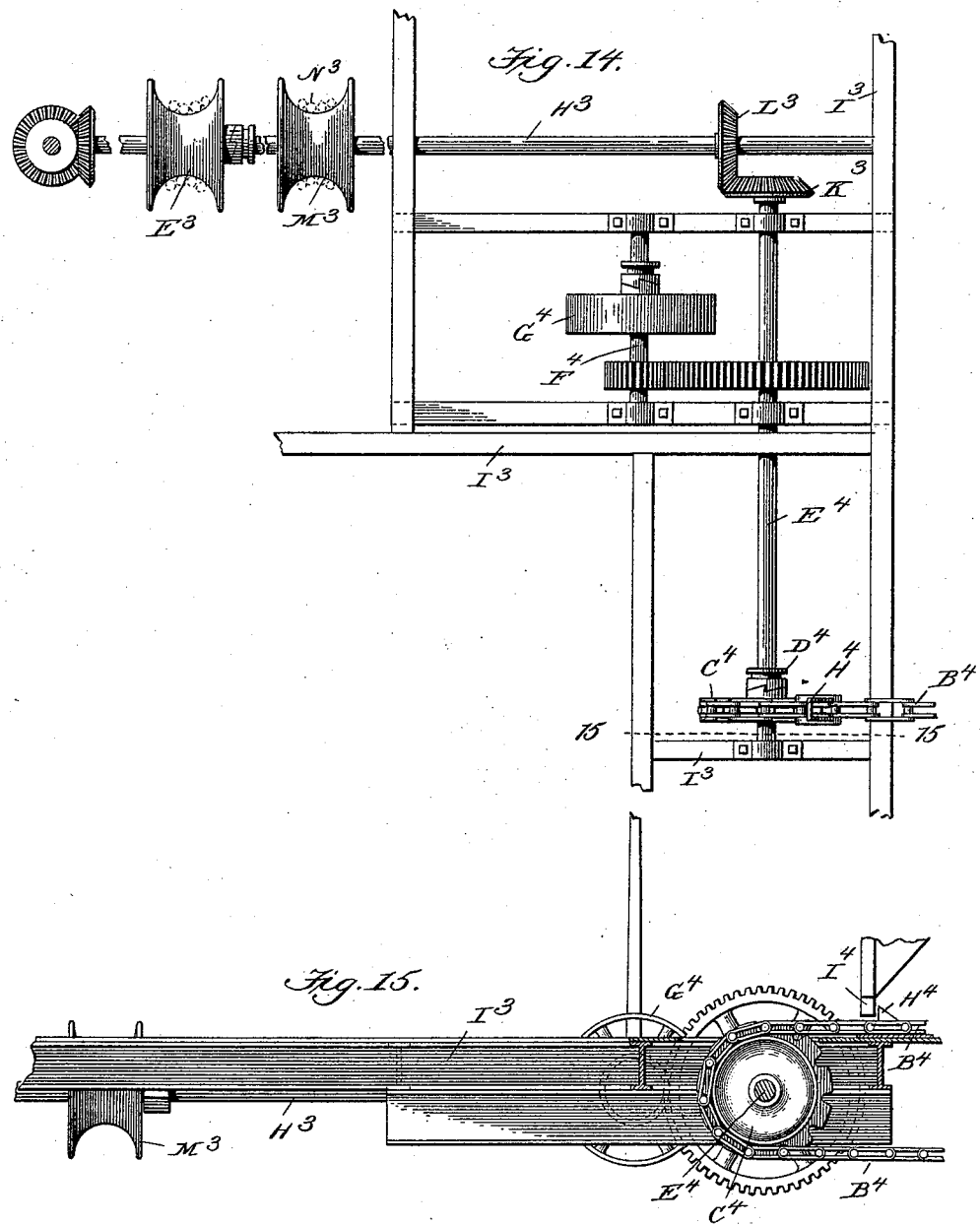

(No Model.) 25 Sheets—Sheet 15.
J. C. ANDERSON.
METHOD OF AND APPARATUS FOR TREATMENT AND REDUCTION OF GARBAGE.
No. 539,245. Patented May 14, 1895.
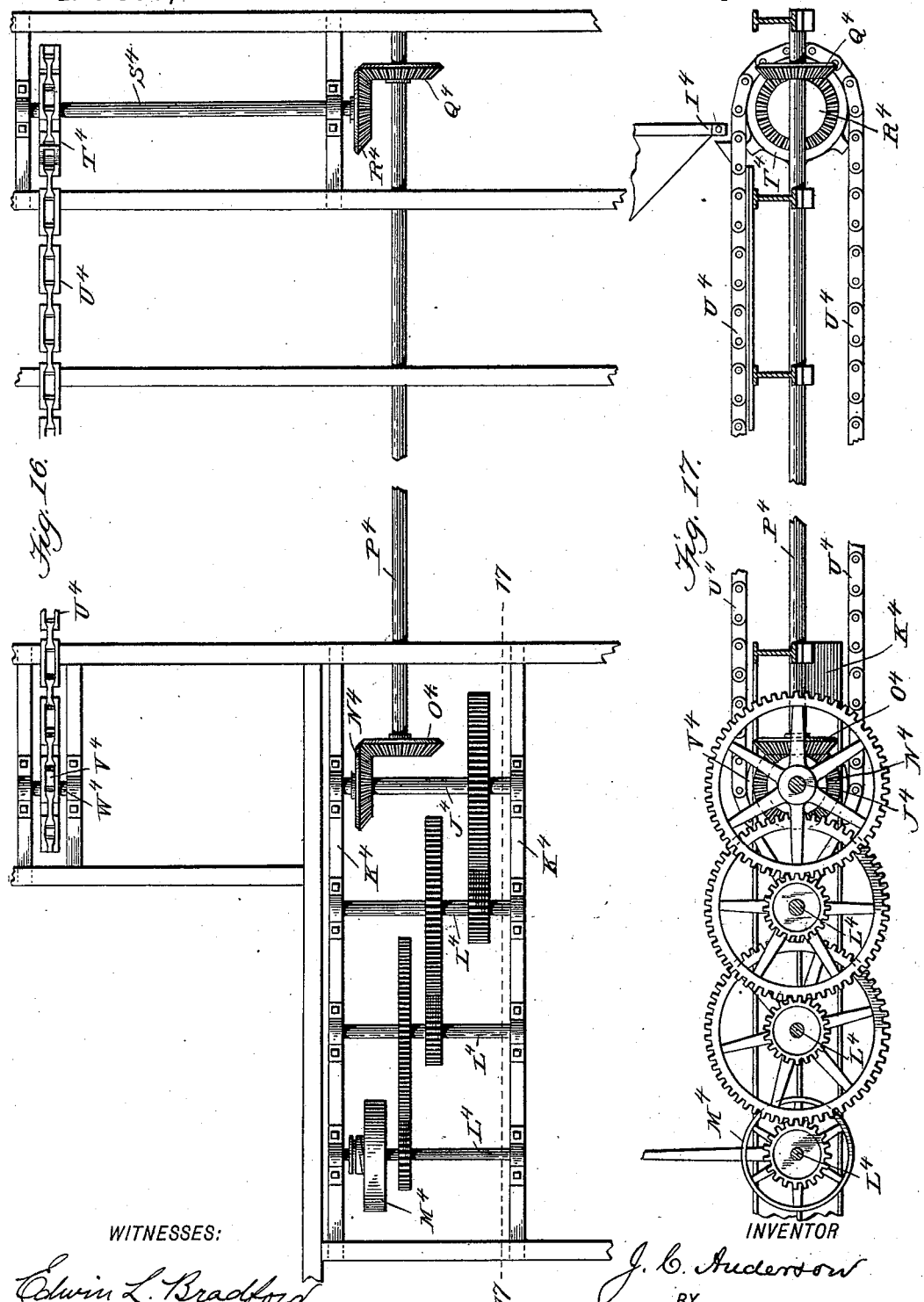
WITNESSES:
INVENTOR
ATTORNEYS.

(No Model.) 25 Sheets—Sheet 16.
J. C. ANDERSON.
METHOD OF AND APPARATUS FOR TREATMENT AND REDUCTION OF GARBAGE.
No. 539,245. Patented May 14, 1895.
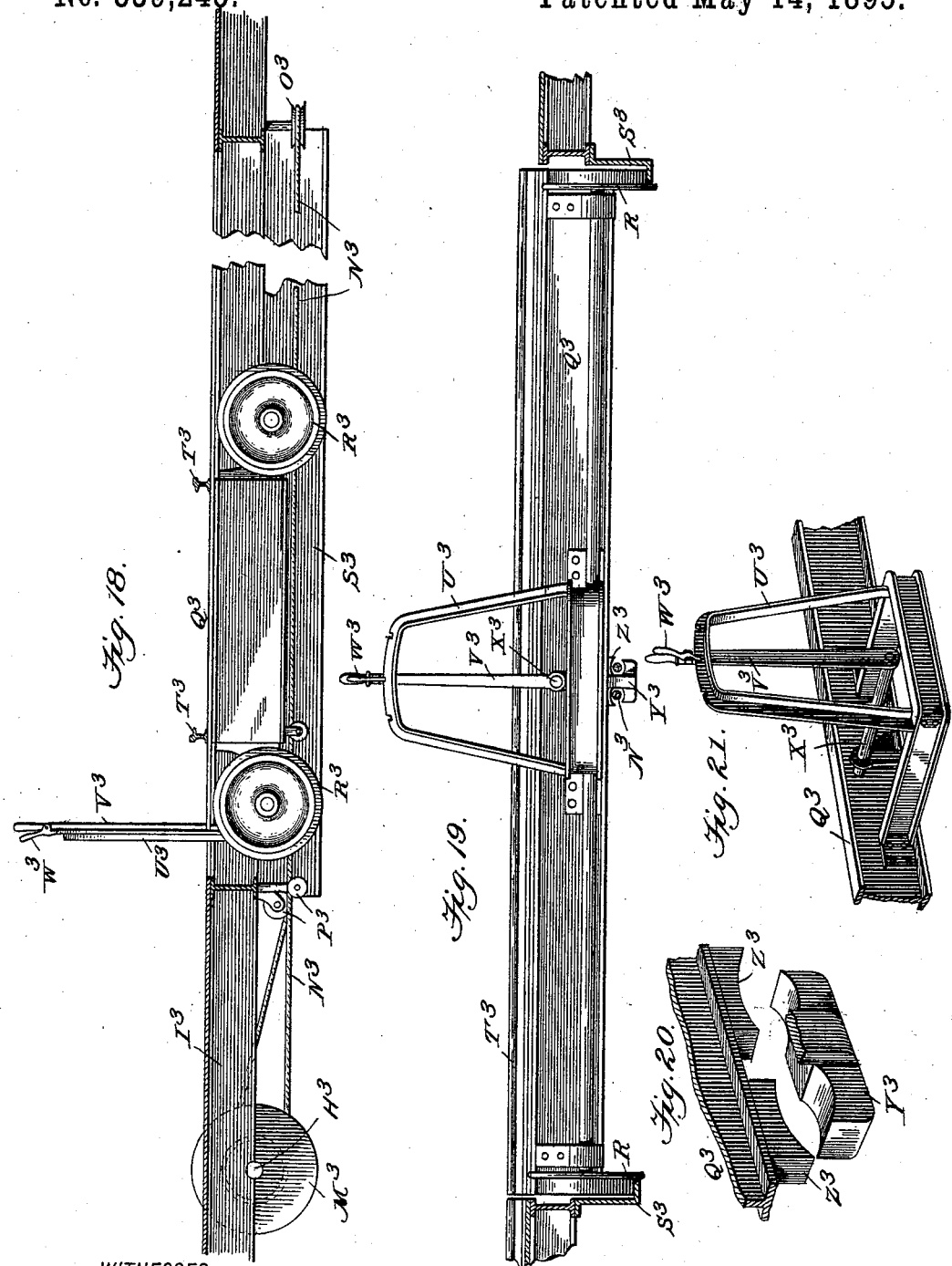
WITNESSES:
Edwin L. Bradford.
N. Curtis Lammond
INVENTOR
J. C. Anderson
BY
ATTORNEY.

(No Model.) 25 Sheets—Sheet 17.
J. C. ANDERSON.
METHOD OF AND APPARATUS FOR TREATMENT AND REDUCTION OF GARBAGE.
No. 539,245. Patented May 14, 1895.
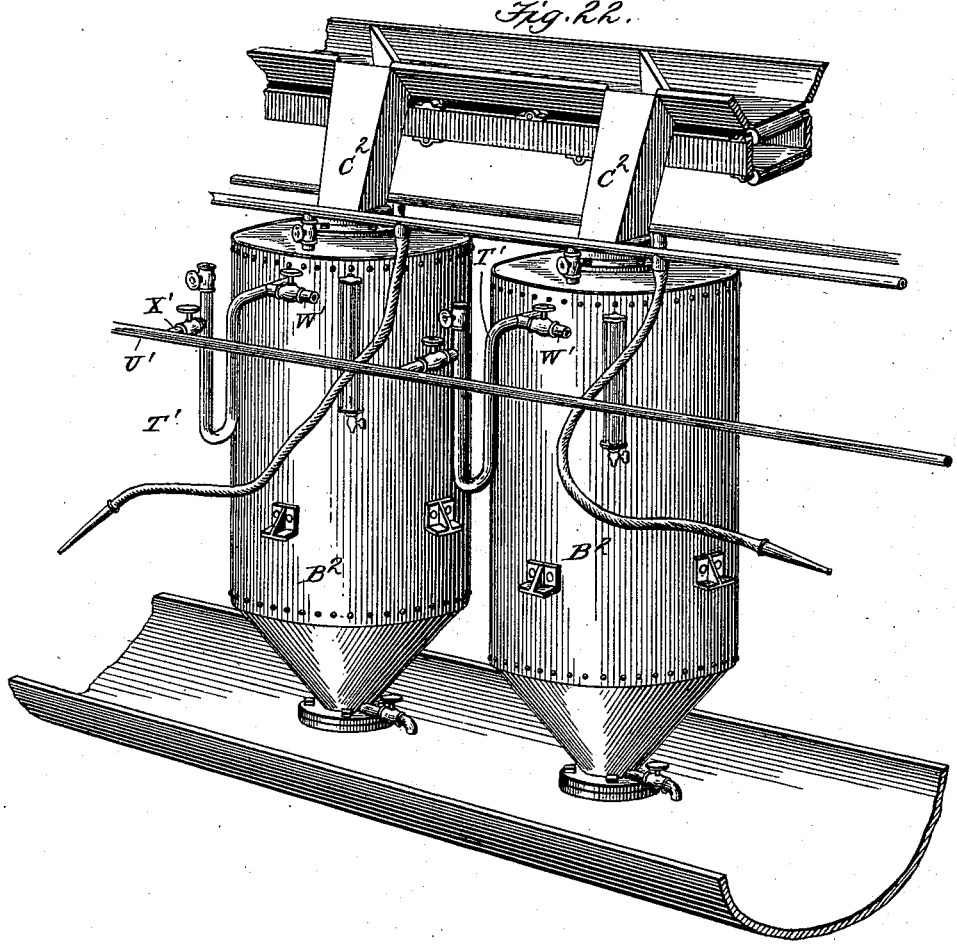
WITNESSES:
Edwin L. Bradford
N. Curtis Lammond
INVENTOR
J. C. Anderson
BY
ATTORNEY.

(No Model.) 25 Sheets—Sheet 18.
J. C. ANDERSON.
METHOD OF AND APPARATUS FOR TREATMENT AND REDUCTION OF GARBAGE.

No. 539,245. Patented May 14, 1895.

WITNESSES:
Edwin L. Bradford
N. Curtis Hammond

INVENTOR
J. C. Anderson
BY
ATTORNEY.

(No Model.) 25 Sheets—Sheet 19.
J. C. ANDERSON.
METHOD OF AND APPARATUS FOR TREATMENT AND REDUCTION
OF GARBAGE.
No. 539,245. Patented May 14, 1895.
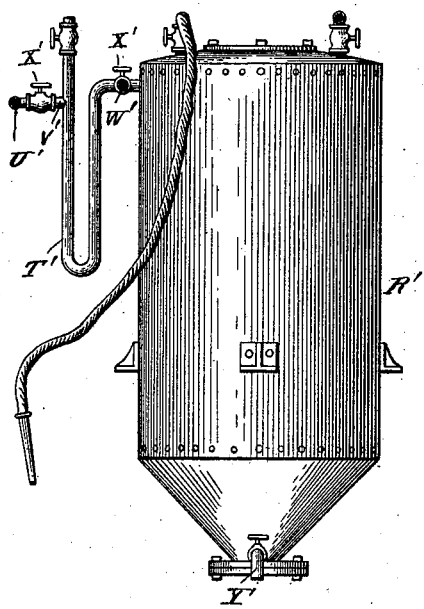
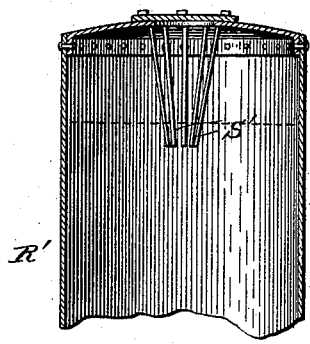
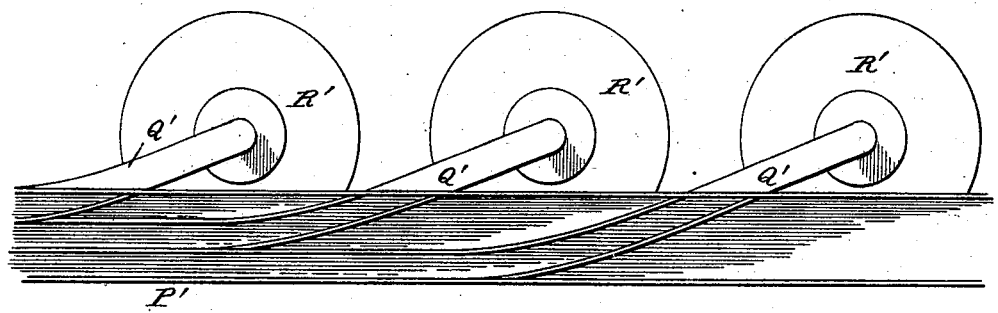
WITNESSES: INVENTOR

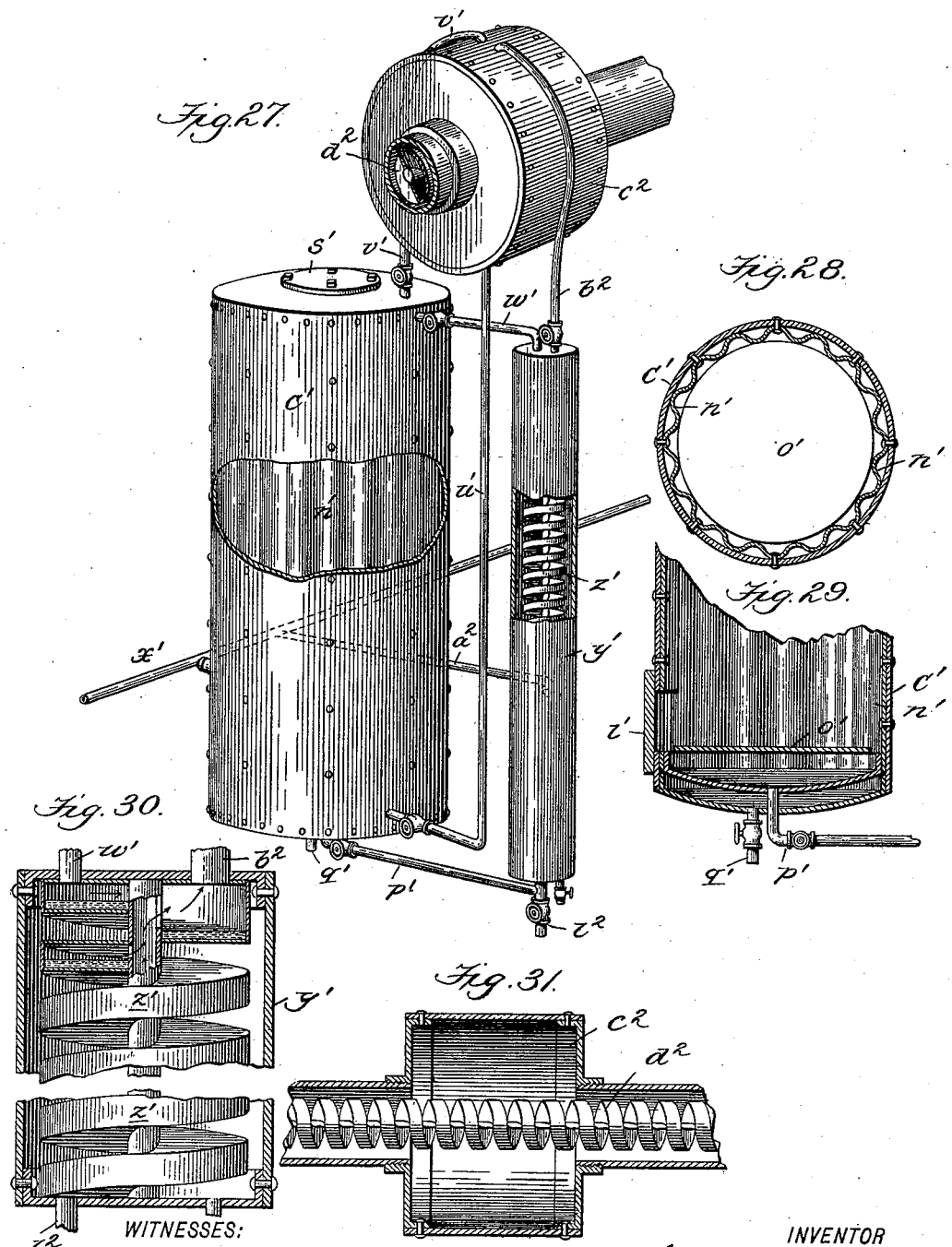

(No Model.) 25 Sheets—Sheet 21.
J. C. ANDERSON.
METHOD OF AND APPARATUS FOR TREATMENT AND REDUCTION OF GARBAGE.
No. 539,245. Patented May 14, 1895.
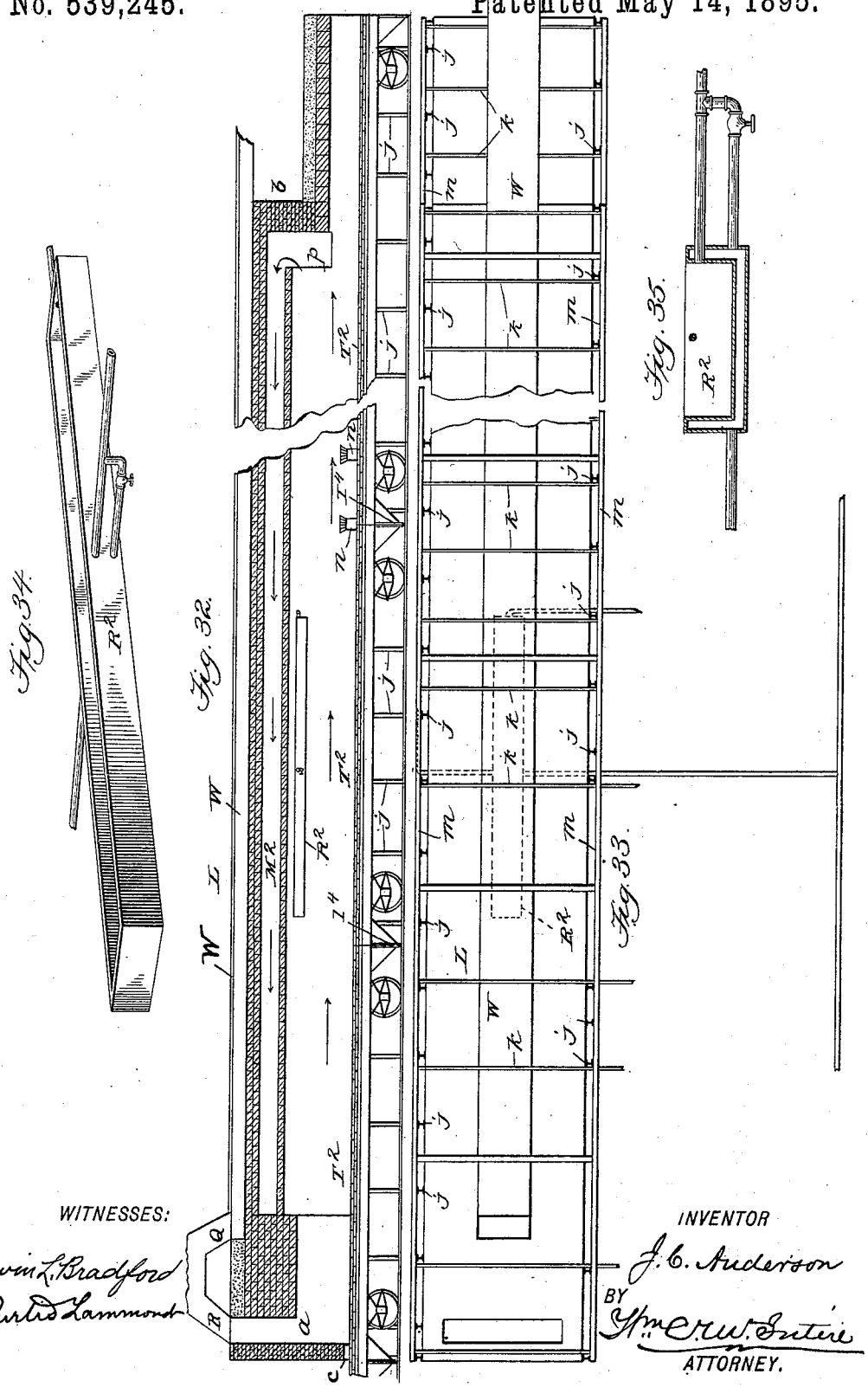
WITNESSES:
Edwin L. Bradford
N. Curtis Lammond
INVENTOR
J. C. Anderson
BY
Wm. C. McIntire
ATTORNEY.

(No Model.) 25 Sheets—Sheet 22.
J. C. ANDERSON.
METHOD OF AND APPARATUS FOR TREATMENT AND REDUCTION OF GARBAGE.
No. 539,245. Patented May 14, 1895.
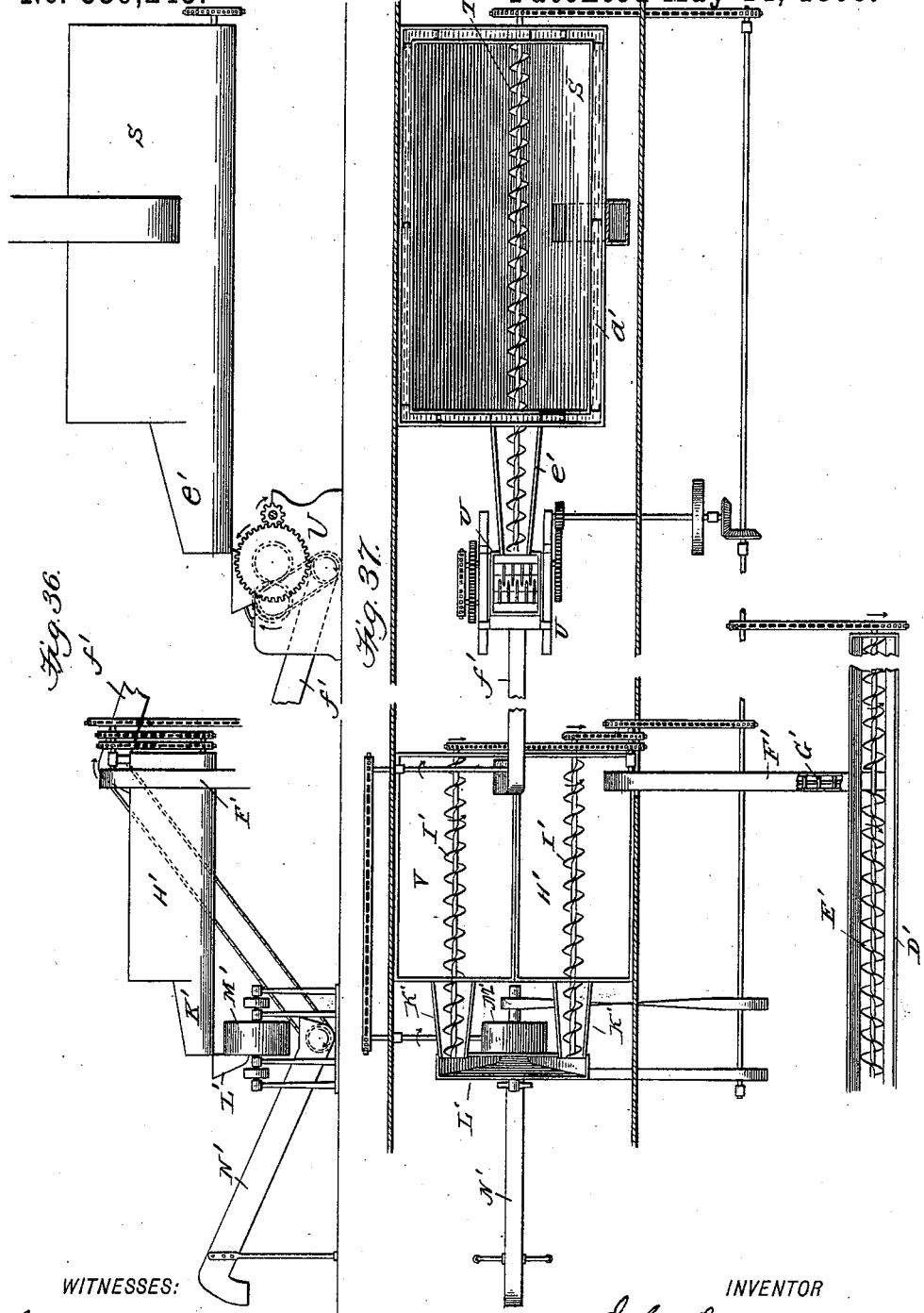

(No Model.) 25 Sheets—Sheet 23.
J. C. ANDERSON.
METHOD OF AND APPARATUS FOR TREATMENT AND REDUCTION OF GARBAGE.
No. 539,245. Patented May 14, 1895.
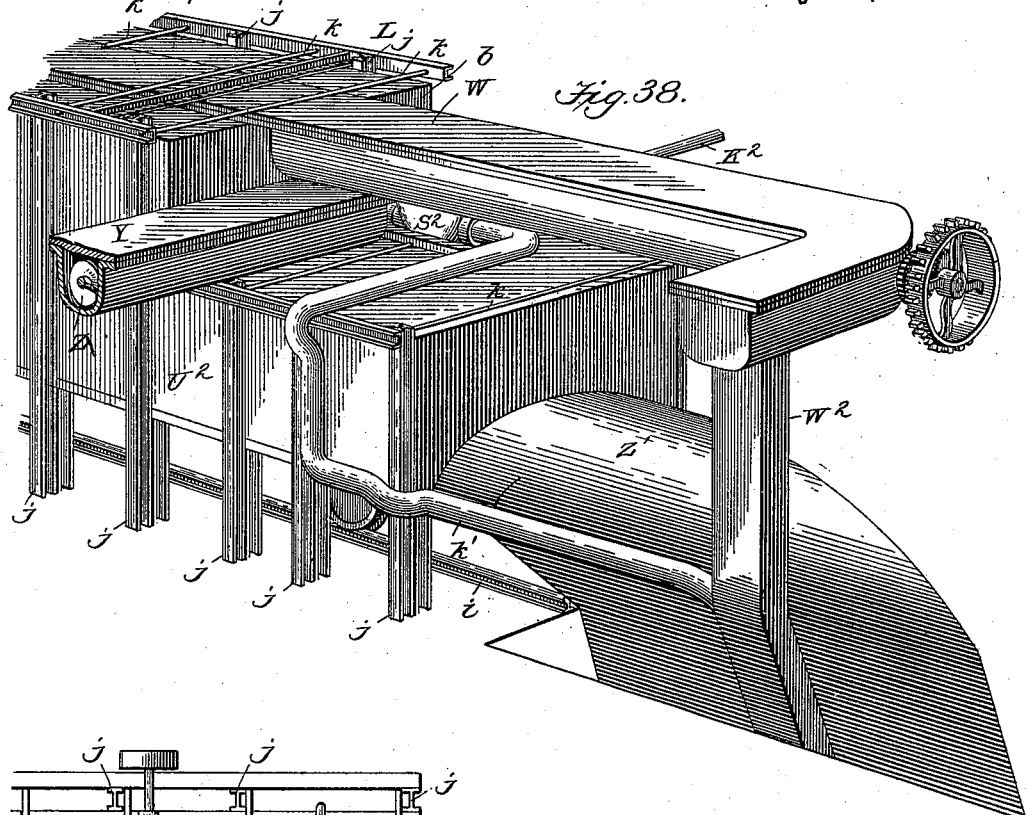
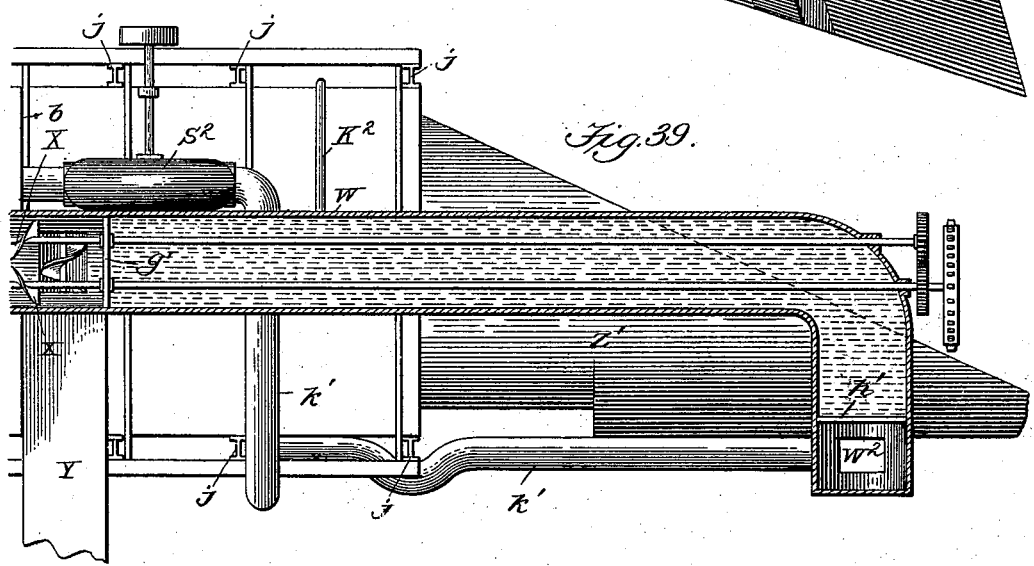
WITNESSES: INVENTOR (No Model.) 25 Sheets—Sheet 24.
J. C. ANDERSON.
METHOD OF AND APPARATUS FOR TREATMENT AND REDUCTION OF GARBAGE.
No. 539,245. Patented May 14, 1895.
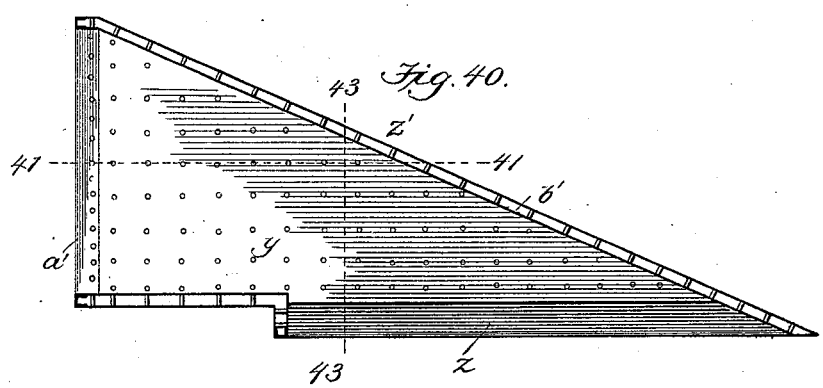
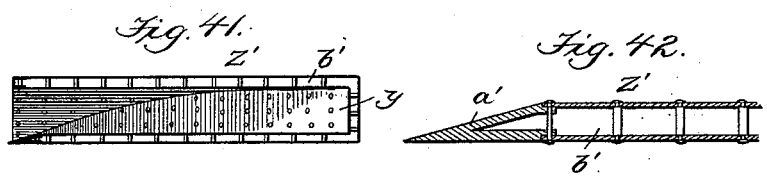
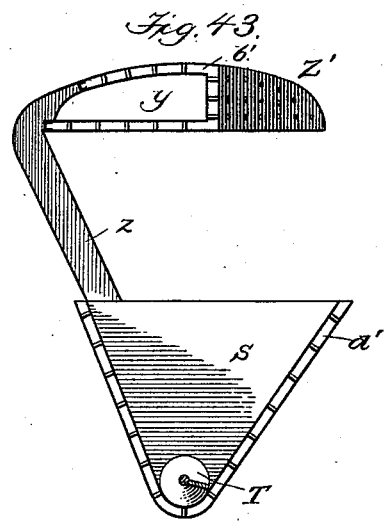
WITNESSES:
Edwin L. Bradford
N. Curtis Lammond
INVENTOR
J. C. Anderson
BY
Wm. C. W. McIntire
ATTORNEY.

(No Model.) 25 Sheets—Sheet 25.
J. C. ANDERSON.
METHOD OF AND APPARATUS FOR TREATMENT AND REDUCTION OF GARBAGE.
No. 539,245. Patented May 14, 1895.
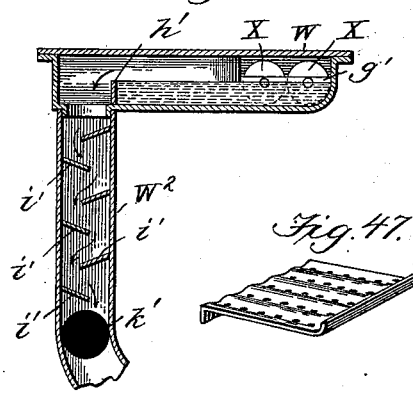
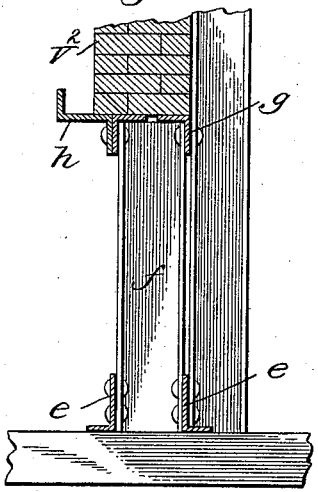
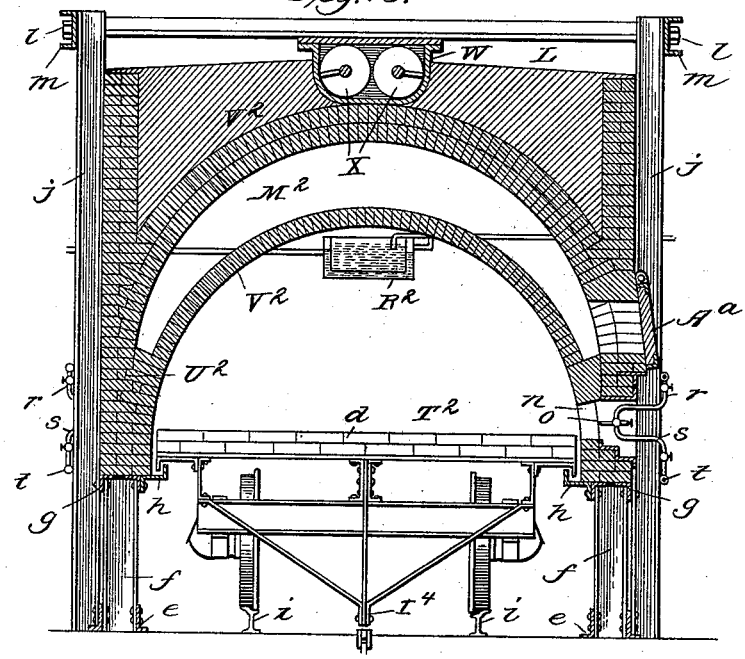
WITNESSES:
Edwin L. Bradford
N. Curtis Hammond
INVENTOR
J. C. Anderson
BY
ATTORNEY.

UNITED STATES PATENT OFFICE.

JAMES C. ANDERSON, OF HIGHLAND PARK, ILLINOIS.

METHOD OF AND APPARATUS FOR TREATMENT AND REDUCTION OF GARBAGE.

SPECIFICATION forming part of Letters Patent No. 539,245, dated May 14, 1895.

Application filed January 25, 1895. Serial No. 536,231. (No model.)

*To all whom it may concern:*

Be it known that I, JAMES C. ANDERSON, a citizen of the United States, residing at Highland Park, in the county of Lake and State of Illinois, have invented certain new and useful Improvements in Methods of and Apparatus for the Treatment and Reduction of Garbage; and I do hereby declare the following to be a full, clear, and exact description of the invention, such as will enable others skilled in the art to which it appertains to make and use the same.

My invention relates to improvements in the method of and apparatus for the treatment of garbage and other refuse.

Garbage in its generic sense consists of ashes of all kinds, slops, street sweepings, dead animals, and materials disused and abandoned, such as rags, bottles, tin cans, &c.

In the present advanced history of garbage destruction it has become a recognized sanitary requirement that no refuse material in which there may be latent or in which there may be created germs of disease, should be dumped and permitted to rot, but on the contrary that it should be subjected to such treatment as to avoid the dissemination of diseases, foul odors, &c.; and for the accomplishment of this result three methods have become recognized as general plans for disposing of garbage. One of these consists in subjecting the mass to the direct action of heat and is known as the incinerating process, whereby the material is consumed and reduced as near as possible to ashes.

Another method involves the idea of keeping the slops proper separate from other refuse material (which is done by proper city ordinances) and then subjecting such slops to a boiling process to liberate the grease, and subjecting it to the action of an hydrocarbon or other solvent whereby the greases are separated from the mass, and the hydrocarbon or other solvent being subsequently distilled off, the greases are thereby recovered.

The third method involves the collection of the garbage upon scows and then towing such scows to places remote from the city and dumping it in tide water where it is presumably carried out to sea. This third method may be also considered as including the dumping of the material into rivers or marshes, where tide water or the sea is remote.

Practical experience in working each and all of the recited methods has demonstrated the fact that from an economic standpoint it is desirable to separate from the general mass and recover all material which may have a value attaching thereto. Hence in the incinerating method it has become customary to separate the valuable products, such as bottles, rags, tin cans, &c., by hand, before subjecting the remainder to the action of incineration. The concomitant disadvantages attaching to such treatment lie in the fact that the recovered materials having been in contact with the mass usually have attaching thereto the germs of disease or foul odors, both of which become a menace to health and are recognized as nuisances.

In the process which involves the treatment only of what is commonly known as slops, and in which the greases are separated from the mass as hereinbefore stated, it is desirable that the water (which constitutes anywhere from forty to even seventy per cent. of the mass) should be evaporated economically before distillation.

I may at this point state that so far as I am aware all plants which involve the treatment in any manner of a portion or the whole of the garbage are stationary plants, and provoke objection on account of location in addition to the other objections named.

My invention has for its objects to separate and recover all valuable products from the general mass of garbage; to cleanse and render pure and healthful all such recovered products; to destroy or convert by heat the valueless part of the garbage, and to convert the residuum resulting from incineration into fertilizer, all without in any manner endangering the health or comfort of the community.

My invention has for a further object to so construct and arrange the apparatus that it shall be a movable plant, and hence may be transported from point to point and thus facilitate the collection of the garbage for treatment, and then further transported to any available or distant point for carrying on the process of treatment and thus avoid the usual objections to fixed locations.

With these ends in view my invention consists of the general process, and in the details of construction and arrangement of the apparatus hereinafter fully described and made the subject of the claims.

The apparatus consists generally of a boat upon and within which are arranged an adjustable conveyer designed to be projected into scows loaded with garbage; a traveling belt or apron upon which the mass is delivered by the conveyer; separating devices which facilitate the removal and distribution of different valuable materials, and permit the conveyance of the remainder to be finally destroyed or converted; hoppers for the reception of the separated materials; automatic means for conveying from such hoppers their respective contents to such apparatuses as are employed in treating the same; wash tanks within which a portion of the materials is washed separately to remove the fatty matters, &c.; separators in which the fatty matters are recovered; condensers in which the volatile and liquid solids are recovered; drying conveyers for eliminating the moisture from the slops prior to treatment of the same for recovering the by-products; a tunnel in which the valueless material is burned upon movable fireproof cars; an ash receiver in which the residuum from the incinerating process is deposited automatically from the cars; mechanism for crushing and reducing the ashes to powder; mechanism for mixing such ash powder with the condensed and other recovered fertilizing constituents; steam boilers from which the power required for running the entire plant is generated by the utilization of the heat after a portion of its energy has been utilized in the incineration of the waste garbage, and the drying of the slops; engines, pumps and connections; tracks, transfers and mechanism for conveying the loaded cars through the tunnel and returning them empty to position for again passing loaded through the tunnel; fuel oil tank and connections; air compressor and connections for operating oil burners and supplying air poker; solvent tanks and connections for holding and distributing solvents; water tanks for holding and distributing sea water to condensers, and fresh water to boilers; capstans and mechanism for handling garbage scows during the operation of unloading the same; condensers and washers within which the fumes and gaseous products of evaporation and combustion are washed and purified; and an electric dynamo and connections for supplying light to the entire plant.

In order that those skilled in the art to which my invention appertains may understand how to work the process and to construct the apparatus, I will proceed to describe the same in detail, referring by letters to the accompanying drawings, in which—

Figure 7:
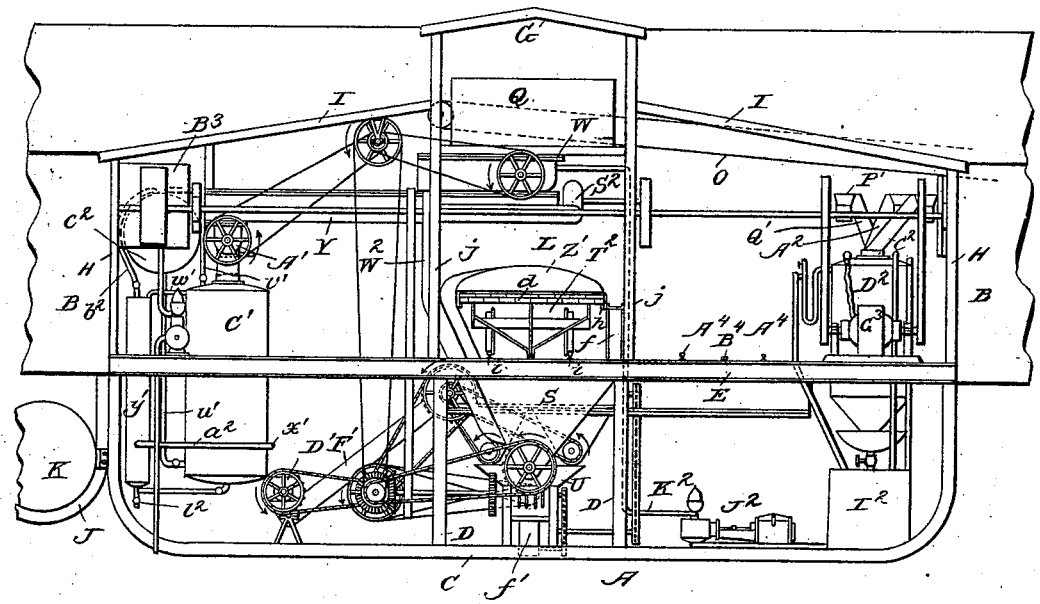
Figure 23:
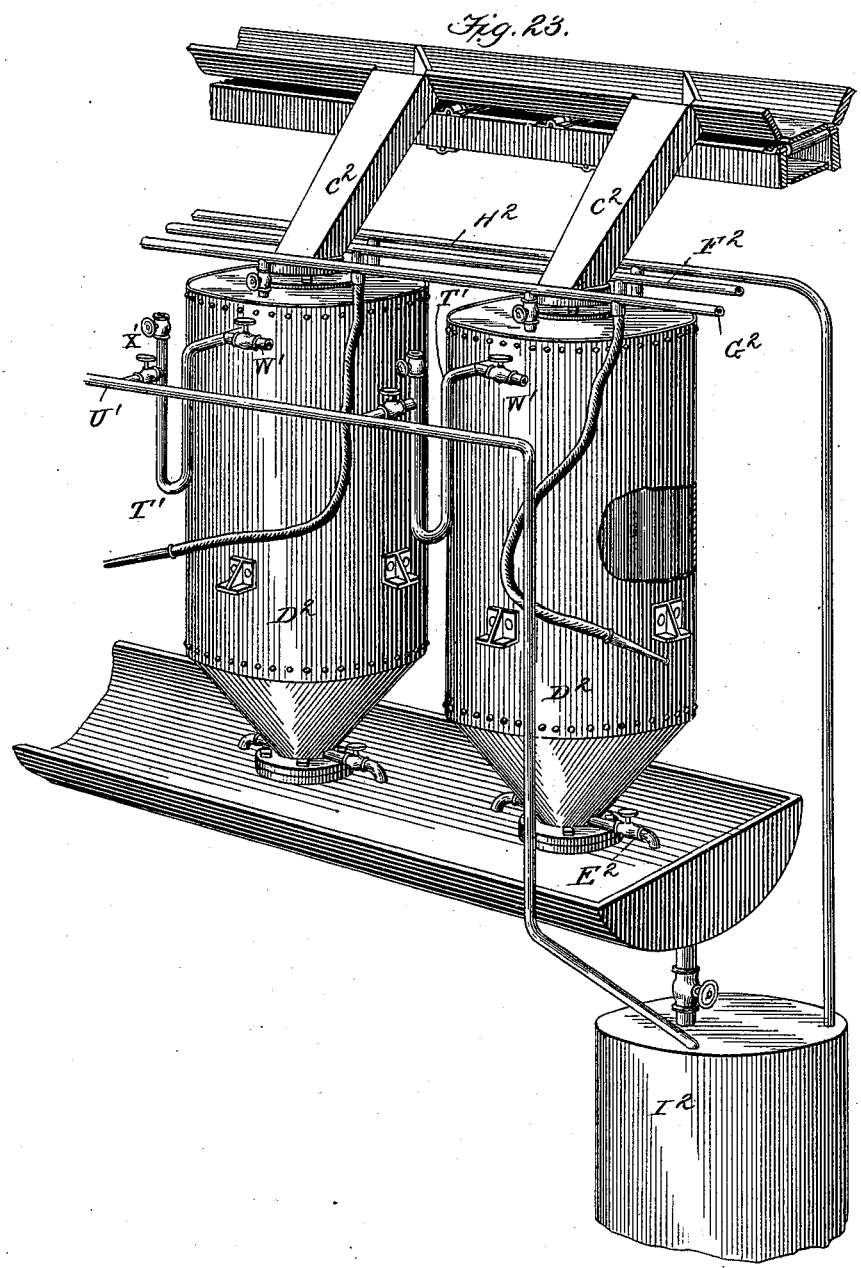

Figure 1 is a perspective view of the boat, upon and within which are arranged all of the mechanism and apparatus employed in carrying out the process. Fig. 2 is an elevation of the front portion of the apparatus partly in section. Fig. 2$^a$ is an elevation of the central portion of the apparatus. Fig. 2$^b$ is an elevation of the rear portion of the apparatus. Fig. 3 is a plan view of the front portion of the apparatus. Fig. 3$^a$ is a plan view of the central portion of the apparatus. Fig. 3$^b$ is a plan view of the rear portion of the apparatus. Fig. 4, Sheet 8, is a plan of the lateral projection. Fig. 5, Sheet 8, is a plan of the lateral projection opposite to that shown in Fig. 4. Fig. 6, Sheet 9, is a front elevation, the bow of the boat being removed to expose the interior. Fig. 7, Sheet 10, is a rear end elevation with the stern of the boat removed. Fig. 8, Sheet 11, is a side elevation of a portion of the boat, parts being broken away to show the conveyer. Fig. 9, Sheet 12, is a view of the opposite side. Fig. 10, Sheet 13, is a side elevation of the elevator, parts being broken away to show interior of same. Fig. 11, Sheet 13, is a transverse section on the line 11 11 of Fig. 10. Fig. 12, Sheet 13, is an enlarged horizontal section on the line 12 12 of Fig. 10. Fig. 13, Sheet 13, is an enlarged vertical section showing conveyer-bucket. Fig. 14, Sheet 14, is a plan view of the apparatus for bringing car back to receiving end of the tunnel. Fig. 15, Sheet 14, is a vertical section on the line 15 15 of Fig. 14. Fig. 16, Sheet 15, is a plan view of the ram chain or apparatus for conveying the cars through the tunnel. Fig. 17, Sheet 15, is a vertical section on the line 17 17 of Fig. 16. Fig. 18, Sheet 16, is a vertical section showing the side transfer. Fig. 19, Sheet 16, is a vertical section taken at right angles to Fig. 18. Fig. 20, Sheet 16, is a perspective view of the grip for gripping the transfer-rope. Fig. 21, Sheet 16, is the lever for operating the same. Fig. 22, Sheet 17, is a perspective view of the tin-can-washing devices. Fig. 23, Sheet 18, is a perspective view of the rag-washing devices. Fig. 24, Sheet 19, is a side elevation of the bottle-washing devices. Fig. 25, Sheet 19, is a vertical section of the top part of the bottle-washing devices. Fig. 26, Sheet 19, is a plan view showing the bottle washers and chutes. Fig. 27, Sheet 20, is a perspective view of the digesting-tank, the solvent-tank, and condensing-tank, &c. Fig. 28, Sheet 20, is a horizontal section of the digesting-tank. Fig. 29, Sheet 20, is a vertical section of the bottom part of said tank. Fig. 30, Sheet 20, is an enlarged vertical section of the separator $y'$, Fig. 27, the middle part being broken away. Fig. 31, Sheet 20, is a vertical section through the solvent tank and condenser. Fig. 32, Sheet 21, is a view of the tunnel, partly in section and partly in side elevation, showing the jacketed water-pan in the tunnel. Fig. 33, Sheet 21, is a plan view of the tunnel, showing the pan in dotted lines and the connecting-pipes. Fig. 34, Sheet 21, is a perspective view of the jacketed water-pan. Fig. 35, Sheet 21, is a transverse section of the same. Fig. 36, Sheet 22, is a side elevation showing the burned-ash hopper, crushing and grinding device, bin for digested material, crushed-ash receptacle, grinding or pulverizing devices, and spout or trough for conveying the material into sacks. Fig. 37, Sheet 22, is a plan view of the same. Fig. 38, Sheet 23, is a perspective view of the tunnel, the ash-remover, and the slop-conveyer. Fig. 39, Sheet 23, is a plan view of the rear end of the tunnel and with one of the conveyers in horizontal section. Fig. 40, Sheet 24, is a horizontal section of ash-remover. Fig. 41, Sheet 24, is a longitudinal vertical section on the line 41 41 of Fig. 40. Fig. 42, Sheet 24, is a detail section of the ash-remover. Fig. 43, Sheet 24, is a section on the line 43 of Fig. 40, showing the burned-ash hopper below. Fig. 44, Sheet 25, is a vertical section of the washer W². Fig. 45, Sheet 25, is a transverse section through the tunnel, slop-conveyer, and jacketed water-pan. Fig. 46, Sheet 25, is an enlarged view showing the construction of the foundation of the tunnel. Fig. 47, Sheet 25, is a perspective view of one of the perforated pans in the washer P².

Similar letters of reference denote like parts in the several views.

A represents the bed or foundation of the apparatus, which is built in the form of a boat and adapted to float and be towed in the water. It is suitably housed, as shown, by a roof and side walls supplied with any suitable number of windows for light and ventilation and with doors at any desirable localities. I prefer to build this boat of fire-proof material such as iron or steel, but it will be understood that in so far as it simply constitutes a floating bed or foundation for the apparatus constructed and arranged upon the same, it may be built of wood, like ordinary scow-work, and then suitably fire-proofed at such localities as may be necessary to secure safety against fire. Preferring however to construct the boat of iron or steel there are necessarily details of construction which are very advantageous and which will hereinafter be described.

As shown in Figs. 3, 3ª, 3ᵇ, 4, and 5, the deck is formed somewhat in the shape of a cross in order to secure the lateral projections B which become necessary to provide the suitable distance for the traveling belt or apron upon which the garbage is delivered by the conveyer.

C are the steel ribs which are sheathed with sheet iron to constitute the hull, and to give it further strength and solidity I arrange a series of vertical steel ribs or studs D each side of the center, and these are sheathed with sheet metal and thereby a strong and rigid bulk-head is made from the bow to the stern of the boat, which adds very greatly to its strength and solidity and also constitutes a firm and rigid support for the longitudinal incinerating tunnel to be hereinafter described.

E are channel beams which are arranged at suitable distances apart, and at any desired localities they are firmly bolted and secured to the ribs C, and also to the vertical ribs or studs D. At that part of the boat which is extended laterally as shown at B, the channel beams E extend over and beyond the vertical plane of the hull ribs C, and constitute suitable supports for the laterally extended deck.

j are steel studs or buck-stays mounted upon bulk-head studs or posts D, and a portion of them extends upwardly to a sufficient height to support the ridge roof G. The remainder extend just above the top of the tunnel in a position to receive cross binding rods by which the upper ends are firmly braced or tied, and thus constitute lateral supports for the tunnel structure and prevent lateral thrust of the same.

Side studding steel posts H are arranged along and near the outer edge of the deck, and are somewhat shorter than the studs G to which they are firmly secured through the medium of the oblique steel beams or rafters I, which constitute the support for the wing portions of the roof. Additional braces and supports may be used wherever found necessary.

Suitable flooring, platforms, galleries, staging and ladders for conveniently attending to the various machinery and parts of the apparatus are to be constructed and connected with the framework of the apparatus in any suitable manner, but these are omitted from the drawings to avoid confusion.

The lateral or overhanging projections B are not only necessary to provide the lineal space for the traveling belt or apron upon which the garbage is delivered for separation and distribution, but under one of said projections scows loaded with garbage may be floated, so that the foot of the conveyer, which is clearly seen at Fig. 1, may be dropped down into the garbage at or near the center of the scow. The other overhanging or lateral projection not only adds to the working space for the apparatus, but tends to trim the boat, and underneath this projection I arrange upon suitable rigid hangers J the hydrocarbon and fuel oil tanks K, so that any leakage which may take place will be outside of the boat.

Arranged longitudinally of the boat, and immediately over the bulk-head so as to avail of the strength of the vertical ribs or studs D, is the incinerating tunnel L, which is best illustrated in Figs. 32, 33 and 45, and the details of its construction will be hereinafter more fully described. The charging or ingoing end of the tunnel is located approximately at a point about one fourth of the distance between the planes of the front and rear walls of the projections B, and extends rearward to such point as will give the tunnel the capacity to receive a predetermined number of cars and at the same time leave sufficient space beyond the exit of the tunnel for properly handling and transferring each outcoming car and returning it outside of the tunnel and back to the forward end for re-loading and re-transit through the tunnel. In the drawings I have shown the tunnel as having a capacity to receive six loaded cars, and according to the scale upon which the drawings are made each of the six cars shown will have a capacity for conveying into the tunnel twenty-five cubic yards, or, in garbage parlance, twenty-five tons, and they are twenty eight feet long and ten feet wide on the platforms.

Near the outer wall, and hung down upon a shaft near the roof in one of the projections B, is a conveyer trough M which is adapted to vibrate upon the shaft so that the lower end or foot N may be dropped into a load of garbage upon an ordinary scow. The foot N of the trough is a section pivoted as shown to the lower end of the trough M, so that the trough and foot may be hoisted up into the position shown in dotted lines at Fig. 8, when it is not in use and adjusted, &c. Within the trough and its foot are arranged over suitable revoluble shafts, conveyer bands with elevating blades or buckets secured thereto, so that when the machinery is in motion and the foot of the conveyer trough is lowered into the mass of garbage the latter is elevated and carried above and dumped onto a wide traveling belt or apron O, which is arranged transverse to the conveyer and near the roof of the boat. This belt or apron passes over ordinary pulleys at each end of its path, and motion is applied through ordinary shafting. This belt or apron should be housed on each side to prevent the material from falling off laterally, as indicated by dotted lines in Fig. 3, and similar to the housing or oblique sides shown on the rag conveyers illustrated at Fig. 23. The illustration of the housing to belt O is omitted in some of the figures of the drawings to avoid confusion of lines. Arranged along the belt and below the same is suitable staging or flooring upon which operatives may stand to select and remove such portions of the garbage as it may be desirable to recover before incinerating the mass. This labor is facilitated by raking and stirring the mass, thus exposing to view those portions which are to be removed. During the operation of removing those portions which it is desirable to recover at once, such as bottles, cans, rags, &c., it is desirable that the operatives shall also to as great an extent as is possible force toward one edge of the traveling apron all slops and vegetable or fatty matters, leaving the ashes and such toward the opposite edge of the apron.

Immediately over the initial or ingoing end of the incinerating tunnel there are arranged over the apron and in close contact therewith two separating blades P hinged or pivoted at their rear ends so that the two may be adjusted in the form of a V which causes the slops proper to be pushed off to one side and into a hopper Q, while the ashes are pushed off in the opposite direction and into a hopper R. If the contents of the apron should not require separation at this point, the blades may be adjusted in an obvious manner to throw the entire contents of the apron to either one side or the other, that is, if the contents are all slops, one blade is adjusted to close the mouth of the ash hopper, and the other blade is so adjusted as to sweep the entire width of the apron and thus throw its entire contents into the slop hopper, and vice versa. The ashes drop through a chute $a$ and onto a fireproof car, as is clearly shown at the left hand end of Fig. 32, and when the latter is properly loaded it is pushed into the tunnel and being carried into the fire zone the contents are thoroughly incinerated and reduced to ashes, which, as the car emerges from the exit end of the tunnel, are scraped off of the car and into a hopper S, and thence they are conveyed by conveyer T to a crushing device U, and from such device to a receptacle or bin V.

The slops, vegetable and fatty matter after being forced into the hopper Q drop by gravity into a closed conveyer trough W, in which are arranged two conveyer worms or screws X, which stir and transport said slops through the trough. This trough and conveyer is arranged immediately over the return flue in the arch of the incinerating tunnel and consequently the moisture contained in the slops is evaporated. This trough extends horizontally and beyond the exit end of the tunnel, where it turns at right angles and travels over the ash remover and ash hopper. The conveyer screws referred to terminate coincident with the drop $b$ of the arch of the tunnel, and the trough at this point and near its rear end is provided with the vertical dams or partitions $g'$ and $h'$ between which a supply of water is contained.

The heated and macerated slop material is pushed out of the trough behind the partition referred to and drops into a transverse trough Y with a screw conveyer Z arranged therein, by which it is thence conveyed by a longitudinal trough A' and conveyer B' over a series of digesting tanks C' which are arranged in a school; and the trough A' is gated or provided with an opening and slide immediately over each of the digesters, as shown by dotted lines at the left hand side of Fig. 7 between the trough A' and the digester C' so that any given digester may be loaded by opening its head and opening the gate or slide in the trough A' immediately over the same; this arrangement and operation being designed so that the digesting of the slop material may be carried on practically continuously, that is to say, while one or more of the digesters is or are expending the necessary amount of time to thoroughly digest their contents, additional slop material is being loaded into another set of digesters, thus avoiding the loss of time if all the digesters were first loaded before beginning the digesting process.

When any one or more of the digesters C' have completed the digesting action the greases are taken off in a manner to be hereinafter explained, and the remaining material which has been moistened by the solvents employed in the digesting operation is then thoroughly dried through the action of steam in a jacket surrounding the digesters. After being thoroughly dried the bottom of the digester is opened and the material is dropped into a trough D' with a conveyer E' therein, which is arranged longitudinally under the series of digesters, and from this trough D' and through a trough F' with conveyer G' to a bin or receptacle H' arranged alongside of the crushed ash bin V.

In each of the bins V and H' there is arranged a screw conveyer or charger I' passing through the head or end of each bin and into a spout K' which leads into a hopper or chute L'. These chutes deliver the crushed ash and dried slop material into a grinding or pulverizing device M' which delivers the thoroughly ground and intermixed ash and slop material into a spout or trough N' having a conveyer therein and with its open end elevated or propped up so that sacks or other receptacles may be placed thereunder to receive the material. The conveyers or chargers I' are so geared and speeded that the respective materials operated upon may be delivered in any predetermined proportion to secure the best results.

The ash before it is crushed is saturated by allowing the waters of condensation carrying ammoniacal liquor and other fertilizing agents to flow upon the same, which treatment not only cools the ash but at the same time enriches it. The manner of recovering the ammoniacal liquors and fumes, which constitute the enriching agents for the ash, will be hereinafter more fully described.

Returning again to the method of separating the various materials included in and forming the general mass of garbage I will proceed to describe the treatment given to the bottles which are picked out of the mass on the separating and delivery apron used initially in the process. The bottles when they are picked off the apron are deposited in the right hand portion of hopper O' which is divided into three compartments leading respectively to three inclined chutes or channels indicated by the spaces between the parallel lines P' (see Figs. 3 and 26) each terminating at their lower ends in switch chutes Q' (see Fig. 26) which chutes lead respectively into a series of steam tight bottle washing devices R' composed of sheet steel or boiler iron. In placing the bottles in the compartments of the hopper O' they are placed with the necks down, and when they are delivered through the top or head of the bottle washers they gravitate between a series of spring tongues or fingers S' secured around the opening of the washing device and converging toward the center in such manner that the bottles will dive neck foremost into the water contained in the bottle washer (the level of the water being illustrated by dotted line). As the bottles necessarily contain air, it will be seen that after plunging into the water they will rise to the surface and float for at least a considerable length of time. When the washer has been charged with a sufficient number of bottles, then the succeeding bottles removed from the mass of garbage are dropped into another one of the compartments of the hopper O' and are carried by another chute and switched into a second washing device, and then the third is likewise brought into use in the same way.

After the bottles have been thoroughly washed and cleansed by boiling in the washing devices, through the action of steam, the grease which has been removed by heat will float upon the surface of the water in the washing device, and other vegetable matter which may have been removed will precipitate and be cooked and subsequently carried off with the water when the device is emptied. The floating grease is removed through the medium of an overflow on a level with the water in the washing device. This overflow (see Fig. 24) consists of a pipe T' bent to form a U, one leg of which connects through the medium of a slightly inclined pipe V' with a horizontal waste pipe U' arranged in a plane below the overflow of the grease. The other leg communicates by a bend and screw connection with the overflow port of the washing device, and is provided with a waste spout or pipe W' to which when necessary may be connected a suitable pipe or hose for mechanically drawing off the grease. Suitable globe valves X' are located as shown to control the action of the device in an obvious manner. As the grease flows through the waste port and into the connecting leg of the pipe T' it passes down the leg of pipe T' until the water also passing into said pipe is of sufficient quantity to float the grease rising up the other leg of pipe T' and causing it to rise and flow out the waste pipe W', while the excess of water will rise in the other leg and out through the inclined drip pipe V' to the water waste pipe U'.

The washing tanks are supplied with water from a continuous water pipe extending over the series of tanks or washers and connected therewith by a short vertical pipe and valve.

The bottoms of the washers are beveled so as to concentrate the contents toward the draw off cock Y', through which the tanks are emptied into an open trough similar to those used under the rag cleaners to be presently described.

In the case of the tin cans, pieces of iron, &c., eliminated from the mass of garbage, they are dropped into another or central compartment of the general hopper O' and are conducted to any one of a series of washing devices B² which are substantially the same as the bottle washers, with the exception that no spring fingers or tongues are necessary around the opening in the top. The trough in this case, as is also the case with the bottle washing mechanism and likewise the rag washers, is provided at its bottom with a traveling belt which conducts the material horizontally over the series of washers, and from such trough (except bottle trough) there are inclined chutes C² with suitable gates, (shown open and in such position constituting deflectors, see Fig. 22) and leading to the several washers. After the cans, &c., have been deposited in the washers they are subjected to substantially the same boiling, washing and grease eliminating action as I have already described with reference to the bottle washing.

Beneath the washers a trough similar to that heretofore described is provided for receiving the water and vegetable matter withdrawn from the washers.

The rags which are picked off from the initial separating apron are deposited in another compartment of the hopper O', and, by similar troughs, traveling belts and chutes to those already described, with reference to the handling of tin cans, pieces of iron, &c., are conveyed to the washers D², which are substantially the same as the other washers described except that the rag washers have around them fluted or corrugated jackets, shown clearly at Fig. 23, in order that when the grease and water have all been drawn off steam may be admitted to the jacket for the purpose of thoroughly drying the rags which when dried are removed by unbolting and removing the bottom of the washer tank. This construction of the washers renders necessary a second draw off cock E² for drawing off the steam which condenses between the jacket and the outer wall of the washer. When the steam is admitted to the jacket for the purpose of drying the rags the valve between the washer tank and the U-shaped overflow pipe is of course closed. The steam is admitted to the jacket through the pipe F² which pipe passing along over the tops of the series of washers is connected with each by a short branch pipe in which is located a valve so that any one or more may be used and the others cut off from the steam supply. In order that a perfect circulation of steam may be secured to attain the greatest amount of heat in the jacket, the space between the latter and the outer wall of the washer communicates at its top with an exhaust pipe G² passing over the series of washers and connected therewith through short connecting pipes with valves in the same manner as the steam supply pipe. H² is another pipe passing over the series of washers and communicating by means of branch pipes and valves with the interior of the washers, so that the moisture evaporated from the rags under the influence of the steam in the jacket will pass up and into the pipe H², by which it is conveyed into a general receiving tank I² into which also all the waters and cooked vegetable matter delivered from the series of washers of all kinds are also delivered, as more clearly shown in Figs. 7 and 23. From this tank the waters, &c., are picked up by the pump J² and forced through the pipe K² into the continuation or rear end of the trough W and behind the dam therein, where it mingles with the other waters therein and is delivered to the ash in the hopper S after it has been removed from the car for the purpose of cooling the ash and also adding fertilizing agents.

After the bottles, rags, tin cans, grease, &c., have been cleansed and recovered they are in merchantable condition to be returned to the market for use.

Having described the treatment of the various materials constituting the garbage and disposed of the resulting waters and vegetable matter delivered by the several washing devices, I will now proceed to describe the treatment of the fumes and gases resulting from the combustion of the material loaded upon the cars and carried into the tunnel.

When the load upon the car is subjected to the initial heating on entering the tunnel in its passage to the fire zone the aqueous fumes and volatile gaseous compounds arising from the load are drawn by the action of the exhaust fan L² (see Figs. 2 and 3) under the arch of the tunnel toward and through the fire zone (which is located at or near the middle of the tunnel) and thence up at a point near the rear end of the tunnel into the horizontal and longitudinal jacket flue M² back to the front end of the tunnel as clearly indicated by the arrow flights (see Fig. 32) and then laterally through the housing N² of the boilers, through passages O² around and between the water tubes of the boilers built in the housing N², thence longitudinally through passages in the "breeching" of the housing into and through a closed washer P² (see Fig. 2) to the exit pipe Q² extending out through the roof of the boat. This washer P² is provided with alternating horizontal pans the free ends of which overlap, as seen, and the bottoms are perforated, the aggregate area of such perforations being such that a portion of the water delivered to the pans will gravitate through the perforations like a rain fall, while the balance will flow over the edges of each pan and fall into the next one below, and finally into the general reservoir or tank into which the washer communicates. Consequently the heat and smoke must pass sinuously not only over the water surfaces in the pans but through the film falling from their edges and likewise through the rain fall or spray dropping through the perforations in the bottom, thus absolutely and thoroughly eliminating all possible smoke or odor if any such should be present at this point after the previous treatment to which it has been subjected.

The fumes and gaseous compounds in their travel, as just described, when they are first generated, and before attaining any considerable degree of heat, pass over a jacketed water pan or condenser R² (see Figs. 32, 34, and 35) which is located just beneath the arch of the tunnel, and thus the ammoniacal compounds are deposited through the agency of natural affinity in the water contained in the pan or condenser R². The supply of water for such condenser comes through a suitable pipe passing through the jacket of the pan or condenser near the upper edge of the wall, a branch of such supply pipe entering the jacket to supply the jacketed space with water, as clearly shown in the detail cross section Fig. 35, the impregnated water passing out of the pan or condenser through a suitable overflow pipe and back to the extension of trough W and down to the ash for fertilizing the same. The fumes and gaseous bodies thus deprived of ammonia, &c., go toward and into the fire zone of the tunnel where they mingle and co-operate with the vapor fuel projected into the fire zone by the hydrocarbon burners at that point, and all combustible constituents are absolutely and completely burned and destroyed; but as before stated the path of travel or draft does not cease until the final exit is reached, and the object of passing whatever may be held by the heat into and through the closed washer is for the purpose of first subjecting it to the reverberating action of arch flue; second, to supply radiated heat over or outside of the arch for eliminating the water out of the slops in the slop-conveyer; third, to supply radiated heat vertically from the roof of the arch to raise the temperature at such point to a sufficient degree to secure the initial evaporating action upon the load on the cars, and, finally, to utilize the residual heat for raising steam in the boilers, such steam being used for the purpose of furnishing all necessary power for running engines, capstans and all machinery used in the plant, and for use in the washers, digesters, stills, &c.

All fumes and vapors which arise from drying the slops and conveying the same to the digesters are drawn through the trough connections finally to the extension of the trough W by an exhaust fan S², located at the rear end of the plant. All the soluble constituents are taken up, washed out and delivered as fertilizing agents to the ashes, and the residuum gases and air are then through proper connections projected into the tunnel flue through the throat near the rear end, and where they are subjected to the reverberating incinerating action which goes on in said flue.

Having described the process of treatment with incidentally so much of the details of construction as has been necessary to make clear the description, I will now proceed to describe accurately and in detail such parts of the apparatus as have not been heretofore sufficiently described and which constitute as a whole the apparatus which I have had to devise progressively to carry out the conceptions of a novel process for the treatment generally of garbage.

In describing the several parts of the apparatus I shall as near as possible describe them in the order of their use in carrying out the process, and I shall therefore first in order describe the elevator devices employed for raising the garbage from the ordinary lighter scows up to the initial traveling belt or apron on which the first separation of materials is made; and to clearly distinguish the details of this device from the others I shall use numerals in lieu of letters of reference.

Referring now to what I have generally called the conveyer trough M and foot N, I will describe the details of construction referring especially to Figs. 10, 11, 12, and 13, Sheet 13. The conveyer trough M has its sides composed of steel channel beams 1, 1 which are braced together by short bridge irons. The upper ends of these beams are pivotally hung upon the shaft of a friction roller, which shaft is mounted in boxes secured to two longitudinal supports properly arranged over the initial end of the separating apron O. A similar roller 2 is arranged between the lower ends of the channel beams 1, 1 upon a shaft which has the bearings in said beams and extends through to the outside of one of them a sufficient distance to receive a sprocket wheel 3. Secured to the lower ends of the beams 1, 1 and on the outside thereof by rivets or screw bolts and at right angles to said beams are two cheek plates 4, between the upper ends of which is mounted a rotary shaft or axle 5 which carries a sprocket pulley between the cheek pieces and also one 6 on the outside. This axle or shaft 5 passes through the sides of the foot N at their upper ends, as clearly shown, and constitutes a pivot upon which said foot is free to vibrate. The foot N terminates in an open scoop-shaped toe 7, and at the heel and between the sides of the foot is secured another sprocket pulley 8. The foot N, as is shown, is closed except at its top and toe and constitutes a trunk. Arranged within said foot is a metal partition plate 9, each end of which laps around the shafts or axles of the upper and lower sprocket pulleys and is maintained in its proper position by screws 10, passing through the sides, or in any other suitable manner. The interior faces of the sides of the shoe are provided with rectangular gutters or channels, shown in solid black at Fig. 10, on each side and parallel with the partition 9.

11 is an endless chain passing around the sprocket wheels at the heel and top of the cheek pieces of the foot N. This chain has secured to it at proper intervals flights or buckets 12 with vertical wings 13 where the flights are cut away to pass around the sprocket pulleys. These wings are provided to prevent any material on the flights or buckets from falling off and onto the chain as it passes over the upper sprocket pulley. An additional safeguard in this respect consists of a shield plate 13ᵃ over the sprocket wheel. The chain 11 is provided at points coincident with each one of the flights 13 with anti-friction rollers 14 mounted on suitable studs, which rollers traverse in the rectangular gutter or channel on the insides of the trunk or foot N, and thus control and carry the chain with its flights through the path or sweep which it is designed to make. The movement of the chain and flights is secured through the medium of a sprocket chain 15 passing around the sprocket pulleys 3 and 6, the former of which being fixed on the axis or shaft of the friction roller 2 at the lower end of the beams 1, 1 is rotated with said roller, when it is set in motion, in the manner presently explained.

Secured to the flanges of the channel beams 1, 1, by angle irons 16, are the beveled sides of the trough M, and mounted in suitable boxes, secured also upon the flanges of the beams 1, 1, is a series of supporting rollers 17, which support the upper sweep of a conveyer belt 18; the lower sweep being similarly supported by rollers secured in boxes to the lower flanges of the beams 1, 1. The band or conveyer 18 travels around the rollers at the upper and lower ends of the beams 1, 1. The shaft or axis 19 at the upper end extends toward the center of the boat about in line with the distributing hopper (but above the same) and is suitably connected by sprocket pulleys and chains, or friction pulleys and bands, with the line shafting, so that the conveyers in the trough M and shoe N are set in motion in an obvious manner.

The speed of the conveyer belts is of course controlled by the character of intermediate gearing. The shaft 19 which passes through the upper ends of the beams 1, 1, extends outwardly a sufficient distance to receive a sprocket pulley 20, which is connected by a chain with a sprocket 21 on a short parallel shaft 22, and on this shaft is a bevel gear meshing with a similar gear on a transverse shaft 23, which constitutes the axis of the friction roller around which the separating belt or apron O travels, which roller imparts motion to said belt or apron.

From the construction and arrangement of the trough M and its shoe N, it will be seen that with suitable lifting chains or ropes attached to them, either or both may be raised or lowered as indicated in dotted lines in Fig. 8, either to accommodate the toe of the foot N to the load or deposit in the scow, or to lift the combined device above the deck and entirely out of the way for the purpose of locating the scow in position to be unloaded or for any other purpose. It will be obvious that as the material is lifted up through the foot N it will pass over the sprocket pulley at the top of the cheek pieces 4 at whatever angle the foot may bear to the trough M, and fall by gravity onto the traveling conveyer belt in the bottom of said trough M and be delivered thereby to the separating apron O.

Having now gotten the garbage from the dump or lighter scows and deposited the same upon the initial end of the separating apron I will describe the latter in detail. This apron, which has been referred to generally by the letter O, is arranged with one end immediately under the dumping exit of the elevator and the opposite end at a point just beyond the outer right hand wall of the tunnel. It is composed preferably of rubber, and passes over and around friction pulleys at each end of its path of travel, and with intermediate rollers to support both the top and returning bottom portions of the belt. These pulleys and rollers are secured in suitable boxes attached to channel beams and the flaring sides of the trough in substantially the same way as just described with reference to the elevator pulleys, &c. This belt passes under the scraper or separator blades P (previously described) and the contents of the belt are scraped off in one or both of the hoppers Q, R, which hoppers are secured in place by suitable supports extending from the buckstays of the tunnel.

The inclined chute of the hopper R terminates at and communicates with a vertical charging chamber $a$ (see Fig. 32) just behind the front wall or end of the tunnel, and the arch of the tunnel at this point is lowered, as seen at $b$, to form and control the height of the load dumped upon each succeeding car as it is slowly pushed into the tunnel. The lowest plane of this drop $b$, as will be seen, is about in line with the bottom of the water pan $R^2$, and as the material will naturally settle to a slight degree the car with its load will readily pass under said pan. As shown at Fig. 32, to which attention has just been drawn, the front wall of the tunnel is sustained on a cross channel beam $c$ which is arranged at such height as to just allow the fire-proof platform $d$ of the car $T^2$ to pass under the same.

Having described the means for delivering the material and properly loading the same upon the cars I will now explain the construction of the tunnel through which the loaded car is passed and give notice that while the tunnel construction is peculiarly adapted for use in the general apparatus employed it is not claimed herein but forms the subject matter of another application for Letters Patent filed by me on the 25th day of April, 1895, Serial No. 547,062.

Mounted upon the channel beams E and extending longitudinally are two pairs of L-beams $e$ which are firmly bolted to the channel beams. To the vertical leg of these L-beams are securely bolted vertical posts composed of I-beams $f$, to the upper ends of which are firmly bolted L-beams $g$ which extend longitudinally along all of said posts, and to the tops of the inner one of each of the posts $f$ is also secured a steel plate $h$, which is of Z- form, and which constitutes the sand seal hereinafter described. This Z-shaped plate and the L-beams g constitute, as clearly shown at Figs. 45 and 46, a suitable foundation upon which the side walls of the tunnel are erected.

As the posts f are arranged at suitable distances apart it will be seen that a free space is left under the tunnel which may be readily traversed for the purpose of at all times inspecting or repairing any of the sustaining structure, and also permits of entire and free circulation of air to the car trucks, which travel upon suitable rails i, secured longitudinally upon the channel beams E; and as the side edges of the platforms of the cars are provided with a longitudinal plate having a wing extending down below the upper edge of the Z-shaped plate h, it will be readily understood that with the trough shaped space between the free leg of the plate h and the interior wall of the arch of the tunnel filled with sand a perfect fire-proof seal is made between the tunnel and the open space below its supporting foundation. After this sand trough has been originally supplied with sand, any waste of the same is compensated for by deposits of ash from the cars, and as such ash is equally as refractory as the sand, it follows that the seal is automatically kept in perfect condition.

Secured to the outside of the vertical wings of the L-beams e and also to the posts f are the lower ends of a series of I-posts j running up a suitable distance above the crown of the arch of the tunnel to constitute what are properly known as "buck-stays." These buck-stays are arranged along the outer walls of the tunnel and at any suitable or desired distance apart, and their upper ends are tied together by cross-tie rods k and nuts l. The tie rods pass through the webs of two longitudinal channel beams m arranged along the outside and at the top of the buck-stays, which latter are also secured by rivets or screw bolts to the beams m, and as a result of such construction any lateral thrust of the walls of the tunnel is prevented, and the frame-work is also longitudinally strengthened.

The tunnel proper is composed of side walls $U^2$ and the arch $V^2$ constructed of suitable fire-brick masonry and capable of resisting the necessarily high degree of heat employed to incinerate the material loaded upon the cars. In order to more fully understand the construction of the tunnel with reference to its action under the influence of the heat necessarily generated for the incineration of the load upon the cars I will refer especially to Fig. 32 of the drawings which represents, as before stated, a longitudinal central section shortened up by breaking away a portion near the rear end.

The charging chamber a is located at the front end, and just in rear of said chamber the arch is dropped as indicated at b and then rising extends rearward at a greater height. Nearer the front end, and at a point which by comparison may be designated as the temperate zone, is located the water pan $R^2$ heretofore described. At just about the middle of the length of the tunnel occurs what I denominate the fire zone, and at which point I project through the two side walls of the tunnel, through apertures n, liquid fuel nozzles o, which furnish the fuel for incineration. These apertures n flare outwardly in order that the flame may be directed when expedient in oblique as well as in straight lines, and also for the purpose of projecting into the load upon the cars what I denominate an air poker, and through which air under pressure is forced into the load to furnish oxygen to the center thereof to facilitate combustion and at the same time to stir and turn over the same to secure more perfect contact with the flame.

Beyond the fire zone, and at a point which may be designated as about one half a car's length from the rear end of the tunnel, is formed a throat p through the arch and leading into a return flue $M^2$ above the arch, which travels back near to the front end and then leads off laterally through openings or passages in the housing of the bank of boilers to generate steam and thence through the washers to the exhaust exit as heretofore explained. Immediately in rear of the throat p the arch again drops down for the purpose principally of constituting a fire bridge to direct the flame and draft up through the throat p, and because the load on the cars having been reduced by incineration no necessity exists for an arch of extreme height.

The hydrocarbon burners or liquid fuel nozzles o connect through suitable pipe conduits r with the fuel oil tank K, located outside the boat and under the deck of one of the projections B, and through the medium of a suitable branch connection s to a conduit or pipe t, leading from an air receiver u which is connected with an air compressor v. Connecting with said air conduit at any suitable point by a flexible connection is an air poker, not shown, but which forms the subject matter of Letters Patent No. 526,284, granted to me on the 18th day of September, 1894, and through the medium of the fuel composed of oil and air projected through the nozzles or burners o, and with the aid of the air poker referred to the incinerating action takes place in the manner described in Letters Patent No. 526,283, granted to me on the 18th day of September, 1894.

In order that the space between the two arches $V^2$ of the tunnel, and which constitutes the jacket flue $M^2$, may be readily cleaned of all deposits of whatever character, a series of tight doors $A^a$ (arranged at each side of the arch) close openings communicating with the foot of the flue $M^2$, and through such openings the deposits may be readily removed. This provision I have found to be essentially necessary because the deposits of fine ash and dust not only retards the draft, but also very seriously reduces the radiated heat which is required in the process.

The fuel oil from the oil tank K is pumped by a suitable pump $w$ into a gravity stand pipe $x$ which connects with the conduit $n$.

The cars $T^2$ are constructed of iron and steel and the platforms are properly fireproofed by the employment thereon of a suitable number of courses of fire brick or other fire resisting material, and with the sealing plate on the outer sides and suitable cross sealing between the ends of the platforms. The trucks are, as heretofore stated, and as will be readily understood, thoroughly protected against the action of heat.

After the load upon the car has been thoroughly incinerated and reduced to ashes the car is forced out of the rear end of the tunnel, and across the path of its travel, and forming a closure of the end of the tunnel is properly secured a metal ash remover $Z'$ into which the ashes are forced and from which they are deposited into the ash bin hereinbefore referred to. As this ash remover is necessarily of special construction, in order that the continuity of the process shall not be broken, and that the operation shall be automatic, I will proceed to describe in detail its construction and operation, and reference is more particularly made to Figs. 40, 41, 42 and 43 of the drawings. As stated, the remover $Z'$ forms, together with the car platform, a closure to the exit end of the tunnel. In its plan it is generally of right angle form, with a vertical wall extending down to the ash bin as shown, and hollow, the hollow space $y$ in the horizontal portion communicating with a hollow space $z'$ in the vertical wall so that the oblique inner surface of the space in the horizontal portion of the remover will push or direct the ashes into the vertical space at one side through which they gravitate to the bin. The forward end of the remover enters the tunnel a distance equal to the sealed space between the ends of the platforms of adjacent cars, so that when a car has made its exit the toe of the shoe will have overlapped the adjacent end of the next succeeding car and thus prevents any dropping of the ashes below the platform. This toe $a'$ is preferably made of steel so that it may be sharp and durable and is secured to the body portion of the remover by a lap-seam and rivets, as clearly shown at Fig. 42. A water jacket, illustrated at $b'$, surrounds the entire ash remover for the purpose of counteracting the effect of the heated ashes entering the remover, and this water jacket is connected by suitable connections with the supply of water in the fresh water tank so as to secure a proper and continuous circulation in the water space, which latter is maintained by suitable stay bolts or rivets $c'$.

After the ashes pass through the remover they fall, as before stated, into the ash bin or hopper S, (see more particularly Figs. 36 and 37) the walls of which curve or converge to the bottom at which point is arranged a worm conveyer T. Surrounding the ash hopper is a water jacket $d'$ maintained in position by suitable channel ribs or braces of any suitable design, and a free circulation of fresh water is secured by suitable connections in an obvious manner. The shaft of the worm conveyer T passes through a tubular connection between the water jacket and the ash bin, and at the forward end the conveyer passes through a spout $e'$ which communicates with the hopper, and the joint of which is made practically water tight. The forward end of the conveyer T has its bearing in a box in the frame-work of the crushing device U, such for instance as that shown and described in Letters Patent No. 262,340, granted to me August 8, 1882. The object of providing this crushing and grinding device is to break up any of the ash which may under the intense heat of the tunnel have become caked or incrusted. From this crushing device the crushed ash is delivered through the medium of a delivery belt $f'$ into the bin V, the construction, operation and purpose of which have already been described.

For comprehensiveness and continuity of description I will now proceed to describe the details of construction of the various devices employed for treating and handling the slop proper after it has been dumped from the hopper to which it was delivered from the initial separating apron.

The conveyer trough W is constructed of steel sheets securely riveted together and of substantially the form in cross section shown at Fig. 45. This trough is closed at the top throughout its entire travel by a cover in order that no odors, fumes or gases shall escape. As before stated it rests on top of the arch of the tunnel to be acted upon by the radiated heat of said arch, and it is securely held in place by lateral braces or connections to the buck-stays $j$. Within the straight portion of this trough W are arranged longitudinally two parallel screw conveyers X so geared that they shall revolve toward each other, and differentially and slowly speeded for the purpose of securing maceration and thorough mixing of the material acted upon. This trough W traverses the top of the arch to that point where said arch is dropped or lowered in rear of the flue throat, and at this point it communicates with a transverse trough Y and conveyer Z arranged below it which transport the material through other connections, heretofore described, to the digesters. The trough W then continues rearwardly and is turned at right angles as shown. Just beyond the point where the delivery is made vertically into the trough Y is arranged a cross partition or dam $g'$ shown in dotted lines at Fig. 3$^a$, and more clearly at Fig. 39. This dam, as will be seen, rises to only about one half the height of the trough so that the fumes, vapors, &c., may pass over it. At the extreme end of this trough is another dam $h'$ similar to the dam $g'$, and the space between the two dams is kept supplied with running water, which takes up all matter having an affinity for water. The extreme end of the trough W then communicates vertically with a washer $W^2$, in which are arranged oblique alternating deflecting wings $i'$ which throw the overflowing water from side to side while the fumes, &c., generated in the trough W which have not been taken up in the water between the dams $g'$, $h'$ are drawn through the sprayed water into the trunk or pipe $k'$ through the exhaust created by the exhaust fan $S^2$. The overflowing and falling water is conducted as previously stated to the bin in which the hot ashes are delivered from the cars emerging from the tunnel and impregnate and cool the same. The dust and steam arising from the covered bin tend to rise up the pipe or trunk $W^2$ and coming in contact with the falling water the steam is condensed and the ash dust with the condensed steam is precipitated back into the bin. Any fumes or odors however which are not capable of such precipitation escape through the exhaust pipe $k'$ to the fan case and then through a short pipe connection on the opposite side of the case are forced into the flue in the arch of the tunnel and assist in the reverberatory combustion; and by reason of the drafts being all controlled through exhaust, rather than blast fans, it will be readily understood that all tendency toward the escape of dust or fumes from any and all wind trunks, conveyer troughs, &c., is absolutely avoided, and such bodies positively controlled and destroyed.

Having described the construction of the trough W, and incidentally the devices which control and take care of the fumes, &c., emanating from said trough, I will now return to the point at which the macerated and dried slops are delivered from the trough W. Below this trough W is a transverse closed trough Y, with a single worm conveyer arranged longitudinally therein. This trough is likewise constructed of sheet steel and is closed at its top. It passes across the tunnel and then over to one side of the boat and terminates at a point over the school of digesters $C'$, where it delivers into a trough $A'$ with conveyer therein, which is arranged as before stated over the centers of the digesting tanks $C'$. Immediately over each digester this trough is formed with a vertical spout through which the material is delivered to the digester when its cap is removed; and a gate is provided at the top of each of said vertical spouts so that the material may be delivered to any one or more of the digesters, which will be described herein as being adapted for use in the general apparatus, but notice is here given that the peculiarities of construction of the same constitute the subject matter of another application for Letters Patent filed by me on the 25th day of April, 1895, Serial No. 547,064.

The digesters $C'$ are made of boiler iron or steel, and with closed man-holes $l'$ in the side near the bottom for removing the digested material, and are provided with an interior steam jacket $n'$ which is crimped or corrugated, as clearly shown in Figs. 27 and 28. A steam space is provided at the bottom and top communicating with the circumferential steam space, and a false bottom $o'$ is provided to prevent the contents of the digester from packing and closing the port of the exit pipe $p'$. The jacket $n'$ is corrugated or fluted vertically for the double purpose of presenting a greater heating surface, and also to prevent the contents of the digester so packing against the walls as to prevent the oils or greases from rising freely, which they will readily do within the flutings or corrugations.

$q'$ is a petcock communicating with the bottom of steam jacket, and by means of which the products of condensation are drawn off. At one side of the digester and near the bottom is provided a liquid tight door or manhole $l'$ through which the contents of the digester are removed after completion of the digesting operation. The opening in the top of the digester through which the material is dropped from the gated trough above is closed by a cap $s'$ which is securely bolted in place after the digester is loaded, there being space sufficient between the bottom of the pipe leading from the trough, and the top of the digester to freely slide the cap $s'$ in place to be bolted in position.

$t'$ are brackets bolted to the outside of the digesters, and which rest upon and are secured to suitable beams and braces to firmly support the digesters in place.

Hydrocarbon solvent is supplied from what I denominate a "solvent tank and condenser" (to be presently described) through a conduit pipe $u'$ leading into the digester near the bottom and provided with a valve to control the supply, and $v'$ is a pipe connecting the head of the digester with the solvent tank and condenser. It is provided with a valve, and through this pipe the vaporized hydrocarbon is returned to the solvent tank and condenser.

$w'$ is a grease conduit or pipe leading out from the digester near its top and communicating with the top of an evaporator and separator which will be presently described. This pipe $w'$ is also provided with a valve to control its action.

$x'$ is a steam pipe connecting with any suitable steam supply and communicating with the jacket of the digester and also with the separator and condenser.

The evaporator or separator $y'$ is cylindrical, as shown, and arranged vertically therein is a specially constructed helical and stationary conveyer $z'$ through which the grease delivered by the pipe $w'$ is conveyed to the bottom, and at which point it is drawn off through the draw off cock $l^2$. The conveyer $z'$ consists of twin helical flights, one flight being closed and the other open, as clearly indicated at Fig. 30. The grease with whatever hydrocarbon solvent may be held therein is delivered at the top of the closed flight of the conveyer $z'$ and such flight being a slow one, said grease, &c., flows slowly and helically down to the bottom of the separator $y'$ while the steam admitted to the separator by the pipe connection $a^2$ being free to circulate around and in the open flight of the conveyer subjects the grease, &c., to a continuous evaporating action, which eliminates all hydrocarbon solvent and permits it in its vaporized condition to ascend and be returned through the pipe $b^2$ into the solvent tank and condenser $c^2$, while the greases descend in liquid form. Arranged within the solvent tank and condenser $c^2$ is a longitudinal twin flighted water conveyer $d^2$, similar in construction to the grease conveyer $z'$ in the evaporator $y'$, and through this conveyer $d^2$ water is freely circulated to promptly condense the solvent vapors which are transmitted from the digester $C'$ and the evaporator $y'$. The solvent tank and condenser is provided with suitable conduits for supplying and drawing off the hydrocarbon solvent, and suitable water connections are made to supply the water conveyer with water. After all the valves and cocks have been closed and the digester $C'$ has been loaded the solvent tank and condenser $c^2$ supplied with the solvent, and the process of digesting is to be begun, the valve in the solvent supply pipe $u'$ is opened and the solvent admitted to the digester. Then turn on steam to the jacket of the digester and also to the separator and evaporator $y'$. Then open the valve in pipe $w'$ between digester and evaporator. Then open valve in the pipe $v'$ between digester and solvent tank $c^2$. The grease dissolved and rising up in the digester and in union with the liquid hydrocarbon solvent will then flow through the pipe $w'$ into the hollow double flighted conveyer $z'$ in the evaporator $y'$ and be drawn off at $l^2$. Any of the hydrocarbon solvent introduced at the bottom of the tank or digester $C'$ which is eliminated from the grease by the heat of the steam jacket passes up through connection $v'$ and is returned to the solvent tank and condenser $c^2$ where it is condensed for re-use, and the liquid hydrocarbon solvent mixed with the grease and flowing into the evaporator conveyer $z'$ will be vaporized by the heat of the steam in the evaporator $y$ and returned to the solvent tank and condenser $c^2$ through pipe $b^2$.

When all the grease has passed off from the digester which may be indicated by an ordinary glass gage, the valves are then all closed and the valve in the pipe $p$ connecting the bottom of the digester $C'$ and evaporater $y'$ is opened which allows any hydrocarbon in the digester to flow to equilibrium in the evaporator and separator $y'$. Steam is then again admitted to the evaporator and separator $y'$ and also to the digester jacket and the valve in the pipe $v'$ and also in pipe $b^2$ are opened, and the rapid evaporation or vaporization of the hydrocarbon solvent takes place in both of the lower vessels and ascends into the solvent tank and condenser, where it is condensed for re-use.

From this treatment it will be seen that in the distillation of the slops proper my process dispenses with a large amount of machinery, such as pumps, duplicating or redistilling stills, solvent recoverers, &c., and that the supply of slops having been loaded into the stills or digesters, and the series of solvent tanks charged with solvent, the whole operation takes place automatically entirely through the distilling and condensing actions, without leakage, or mechanical transfer, and that no loss takes place by leakage, no foul odors or gases escape, and that economy both in time and material ensues.

Any remaining grease in the digester tank will gravitate to the bottom and will be drawn off and deposited into any suitable pipe or trough under the digesters and separators and conveyed to any suitable receptacle, and the grease delivered from the evaporator and separator $y'$ is similarly conveyed to the general grease receiver or receptacle. The tankage of solids is left thoroughly dried and free from grease, hydrocarbon and moisture.

As before stated the digesters $C'$ with their companion solvent tank and condenser $c^2$ and separator and evaporator $y'$ are arranged in a school, and the hydrocarbon solvent which is pumped by a pump $e^2$ into the first tank flows freely through the whole school of solvent tanks and condensers $c^2$ and the water passing through the water conveyer $d^2$ of the first tank likewise flows through all of the conveyers in a series of tanks and condensers and a portion of said water is by suitable branch pipes conveyed to the water pan $R^2$ in the tunnel and to the jacket thereof from whence it flows and is delivered through the conduit pipes heretofore described to the washer $W^2$. It will thus be seen that while only a given number of the digesters and companion devices may be in actual use, the solvent tank and condenser connected with such digesters receives the beneficial influences resulting from continuous connection with the other solvent tanks and the continuous circulation of water through the whole system.

As the peculiar construction of the helical twin flight conveyers employed both in the evaporator and separator $y$ and in the solvent tanks and condensers will form the subject matter of other applications, I will describe more in detail their construction with a view of illustrating the peculiar advantages derived therefrom, and in their use in connection with the evaporator and separator and in the solvent tanks and condensers. In the conveyers referred to there is a central (and preferably hollow) core or stem around which the twin flights or helical blades traverse, and the edges of two of said blades are connected or closed by a straight or vertical wall, the adjacent space between the edges of said flights being open, the result of such construction being that the closed space while helical in a vertical direction is rectangular in a transverse direction and the presence of the central core or stem causes the body flowing through the conveyer to traverse a greater distance and to be subjected to a greater influence of the surrounding heat than would take place in an ordinary worm, while at the same time the products of evaporation may rise more readily and are subjected to a much greater amount of heat and likewise to a more extended evaporating surface. It will be seen that in the action just described the advantages relate to evaporation and separation, but in the case of the solvent tank and condenser the advantages resulting from the peculiar construction of the conveyer lies in the fact that a greater condensing surface and contact with the hydrocarbon solvent is attained than is otherwise obtainable through the use of the ordinary worm condenser. Attention at this point is particularly called to the fact that as a result of the treatment of the slops proper all of the water and moisture which constitutes generally about two thirds in weight of the slop material is evaporated and removed before the solid portion is delivered hot to the digesting tanks, and that this result has been accomplished by the use of heat which would otherwise be wasted. Thus a large saving is accomplished as compared with any other known methods and in which heat has to be especially provided to accomplish the same result; and it will be further observed that the water and moisture which has thus been eliminated from the mass has been thoroughly vaporized, all ammoniacal and volatile products abstracted and the residuum vapors forced into the reverberatory arch of the tunnel and consumed, and in this way the product which is known in other processes of treatment as the "coffee water," and which is exceedingly objectionable in odor and otherwise, is entirely and absolutely avoided.

In transferring or conveying the tankage from the digesters, if it should be found that the material contains any bulky matters such as large sized bones, &c., it should be passed through a crushing device similar to the ash crusher U, which may be located at any suitable or desirable locality intermediate of the digesters and the hopper or bin H'.

It is desirable at this point in the description of the apparatus to describe accurately the location and character of the boilers which receive the last effect of the heat generated in the tunnel and which has been previously utilized for burning the waste portion of the garbage, drying the solid vegetable matters, &c.

In a plant of the kind I have described it will be understood that it is very desirable that it should be kept in continuous operation, first from an economic standpoint, and so that there will be no waste of fuel in re-establishing the required and uniform degree of temperature, and, second, to avoid the disadvantageous results which would ensue, especially in the tunnel and other masonry from expansion and contraction resulting in variation of heat. As the boilers constitute of necessity an essential feature of the general plant, and as one set could not be used continuously, it becomes necessary to provide two or more sets of boilers so that one or more sets may be disused and cleaned or repaired and another set brought into action, and to accomplish this end two or more sets or banks of boilers are mounted in the housing $N^2$ which is connected with and built out laterally from the tunnel $V^2$ near its initial end. This housing $N^2$ is of course composed of masonry and is supported upon a foundation substantially like that upon which the tunnel is erected. The housing $N^2$ and the flue of the tunnel are connected through passages $O^2$ which are all provided with vertical dampers or gates $X^2$ which are operated from above by suitable rods or chains in an obvious manner. The housing terminates laterally in what is technically known as a "breeching" and in which is formed any desired number of flues $Y^2$, which are separated one from another by vertical, longitudinal and cross partitions, as clearly shown in section at Fig. 3, so that each bank of boilers will have an independent flue in the breeching. The breeching flues all pass through the front wall of the breeching into the exhaust pipe leading into the closed washer $P^2$ at the front end of the plant, and the opening of each of such flues through the said front wall is provided with a gate or damper, so that its connection with the washer may be made or closed at will.

From the construction shown and described it will be understood that the heat from the flue in the tunnel may be directed under and around the tubes of any one or more banks or sets of boilers for the purpose of generating steam, and then pass freely into and through the washer and out of the final exit pipe, while any other one or more sets or banks or boilers are absolutely cut off from heat, and thus the various sets of boilers may be rested or repaired at pleasure without in any manner depriving the plant from a continuous supply of steam, and no occasion arises for shutting down the fires in the tunnel for the purpose of permitting of such rest or repair to the boilers.

It will be observed that in the travel of the heat, controlled as it is through its passage to the final exit, it is made to subserve all of the requirements where heat is necessary throughout the entire plant, and consequently great economy in this respect is secured.

There are two engines $f^2$, and $g^2$ one at each end of the plant as shown, with all the shafts, belts, pipes and other connections, as clearly illustrated (and which need not be definitely described) for transmitting power and motion wherever required.

$A^3$ is the fresh water tank and $B^3$ is the salt water tank. These two tanks are necessary because while the salt water is available and useful in all the washing, purifying, cooling and fertilizing steps, fresh water is essential for use in the steam boilers, and as in many instances the plant will be floated in salt water it will be necessary to transport fresh water by tug or otherwise to the fresh water tank.

These two tanks are connected by suitable pipes and conduits as clearly shown (and which to avoid confusion are without reference letters) in order that the supply may be delivered wherever it is wanted.

$C^3$ are capstans located at each end of the plant or boat and are designed for hauling the garbage scows into position partially underneath the extension B, after which the scow is made fast by any suitable grip to an endless wire rope $D^3$ which passes with several turns around a concave winding drum $E^3$, as shown, and thence over guiding sheaves or pulleys $F^3$ so that the rope $D^3$ shall be endless and have a slow creeping movement in one direction for the purpose of hauling the scow slowly toward the bow of the boat to gradually bring the load within the influence of the elevator shoe.

$G^3$ represents a suitable dynamo which may be connected by any proper belting to the shafting of the plant and may be run when necessary for supplying light by any suitable system of wires and lamps.

I will now describe the mechanism by which the cars are carried through the tunnel, transferred at the exit thereof, returned outside of the tunnel, and then transferred to the initial end or mouth of the tunnel for re-loading and re-transit through the tunnel.

I have just described the concave drum with the endless wire rope passing around the same and suitable sheaves or pulleys for the purpose of moving the garbage scows slowly under the foot of the elevator. This drum is fixed upon a shaft $H^3$ (see Figs. 14 and 15, Sheet 14) journaled in suitable bearings secured to the framework $I^3$ and is driven through the bevel gears $K^3$, $L^3$. On the shaft $H^3$ nearer to the framework is also secured another concave drum or pulley $M^3$ around which another wire rope $N^3$ is coiled several times, and which then passes over a suitable sheave or pulley $O^3$ on the opposite side of the boat so that the rope will travel across and back under the side transfer in front of the mouth or entrance of the tunnel. This arrangement is clearly shown at Fig. 18, and where will be seen guiding sheaves $P^3$ on the under side of the side transfer (to be presently explained) and which guide the rope into the horizontal plane in which it may be gripped to move the transfer in either direction. The side transfer consists of a platform $Q^3$ mounted upon trucks $R^3$ adapted to run upon hanger rails $S^3$ secured to the deck beams of the boat and traversing crosswise, and so arranged that the platform of the transfer will be coincident with top surface of the deck. On the top surface of the platform of the transfer are secured rails $T^3$ gaged similarly with the trucks of the fireproofed cars. Secured to the platform $Q^3$ and extending vertically up through the same is a "grip" composed of a yoke $U^3$ and handle bar $V^3$ provided with a pawl $W^3$; the top edge of the yoke being provided with three notches to receive the pawl. The lower end of the handle bar is pivoted to a shaft $X^3$, the opposite end of which has its bearing in the frame of the transfer and fixed to this rocking shaft is plate or block $Y^3$ slightly concaved each side of its center. Secured also to the under side of the transfer frame and immediately over the block $Y^3$ is another plate or block $Z^3$ having concaves similar to the block or plate $Y^3$. The two blocks are so arranged relatively to each other that the wire rope $N^3$ will lie and travel freely between the two blocks $Y^3$ $Z^3$, when the pawl of the handle bar is in the central notch, and when the bar is vibrated to either one side or the other the rope will be correspondingly gripped on one side or the other, and as the arrangement of the drum and sheaves around which this rope passes is such that one side of the loop travels in one direction while the other moves in the reverse direction it will be seen that the transfer may be moved in either direction. At the rear end of the tunnel is arranged a similar transfer operated in the same manner, and along the outside of the tunnel are laid track rails $A^4$ gaged to receive the trucks of of the fireproof cars and to abut and form continuations of the rails on the front and rear transfers when they are moved into alignment. Between and central of these side rails $A^4$ travels a continuous chain $B^4$, the links of which are so constructed that they will freely slide along upon a steel gutter or channel-iron laid upon the deck for that purpose, and a similar gutter or channel-iron is arranged below the deck to similarly sustain the lower sweep of the chain. At the rear end of the boat this chain passes around an idler pulley or sprocket and at the forward end it passes around a sprocket wheel $C^4$ secured by a clutch $D^4$ to the shaft $E^4$ mounted upon the drum frame $I^3$. This shaft $E^4$ is geared to a driven shaft $F^4$ upon which is a clutch band pulley $G^4$ to which motion is imparted by a suitable band from the line shafting of the plant.

At one or more suitable points the chain B is provided with a spur $H^4$ which is provided for and adapted to abut or come in contact with a similar spur or shoulder $I^4$ on the under side of the fire proof cars, so that while said spurs are in contact and the chain is in motion the car will be carried along by the same. The location of the sprocket wheel $C^4$ at the front end and the idler at the rear are such that the spur $H^4$ on the chain will travel out of contact and into contact with the spur on the car in such manner as to take hold of the car and to release it at proper points with reference to the side transfers at the front and rear of the tunnel. (See Figs. 14 and 15.)

Arranged at the front end of the boat and in line with the center of the tunnel is located what I denominate a "chain ram" for pushing the loaded cars through the tunnel. This ram consists of a chain similar to that used for the side tracks just described, and is provided with a spur $H^4$ similar to those described. In advance of the tunnel and at one side thereof, and at about the center of the path of the side transfer $Q^3$ is a horizontal shaft $J^4$ mounted in boxes secured to beams $K^4$ fixed to the under side of the deck beams. Parallel with and in advance of said shaft $J^4$ are a series of similar shafts $L^4$. The first shaft $J^4$ is geared by a gear and pinion to the next adjacent shaft $L^4$ and each succeeding one to the next in a similar manner, in order to secure the greatest amount of power and at the same time to provide for slow movement to the first shaft $J^4$. The first one of the shafts $L^4$ or that one farthest from the front wall of the tunnel is provided with a clutch band pulley $M^4$ and suitable connection is made with the line shafting to transmit power and motion. Near one end of the shaft $J^4$ is secured a bevel gear $N^4$ which meshes with a similar gear $O^4$ on a longitudinal shaft $P^4$ which extends under the front wall of the tunnel a distance sufficient to secure (as will be presently explained) the proper introduction of a loaded car into the tunnel, and at its rear end it is provided with a bevel gear $Q^4$ meshing with a similar gear $R^4$ on a transverse shaft $S^4$ which extends laterally just beyond the longitudinal center of the tunnel, and on this shaft $S^4$ at a point coincident with the longitudinal center of the tunnel is secured a sprocket wheel $T^4$ over which the ram chain $U^4$ having the spur $H^4$ thereon, as described, travels. Coincident with the axis of the shaft $J^4$ and in line with the sprocket wheel $T^4$ an idler sprocket wheel $V^4$ is mounted on a short shaft $W^4$ and the chain $U^4$ passes around this idler, as clearly shown. From this arrangement it will be seen that as an unloaded car is brought in front of the tunnel by the side transfer $Q^3$, and when it is in line with the center of the tunnel, the spur $H^4$ of the chain $U^4$ will be brought in contact with the spur or shoulder on the under side of the front end of the car (there being one at each end) and as the chain $U^4$ travels longitudinally of the tunnel the car will necessarily be forced into the tunnel by the power initially applied through the band pulley $M^4$, the relation of the operating chains and side transfer being such that the spur $H^4$ on the chain $U^4$ will carry the car its full length into the tunnel before contact between the spurs is released by the spur $H^4$ traveling over and down from the sprocket wheel $T^4$. As each car is loaded as hereinbefore explained and pushed into the tunnel, another one is brought into position to be loaded and carried into the tunnel and abuts against the preceding car which it pushes along, and so on the cars are all consecutively loaded and forced into and through the tunnel. As they are unloaded and make their exit from the rear end of the tunnel they are forced onto the side transfer at that end by which they are conveyed into alignment with the side tracks outside the tunnel, and then returned as before explained toward the front end.

When in the claims I refer to a "separating belt or apron" I mean a belt or apron which is so situated as to enable workmen to stand contiguous thereto and pick the bottles, rags and other valuable and easily separated materials from the mass, the remainder being controlled by pivoted guide plates.

It will of course be understood that the various clutches described in this system of transferring and forcing the cars is for the purpose of stopping and starting at will whenever for any reason the usual continuous travel and speed is not desirable.

There may be many little details of construction shown in the drawings which I have omitted to specifically describe, such as the general course and direction of line shafting, belting, steam and water pipes for general supply, &c., but it will be understood by those skilled in the art to which my invention pertains, or who may be familiar with rigging and setting machinery that suitable and customary connections are necessarily required and made.

Having described the various steps involved in the method of treatment and the construction, arrangement and operations of the several parts or devices constituting the apparatus, I wish it to be understood that while I prefer to make the method a continuous one in its various steps, I do not confine myself thereto, as I may if desirable treat any one or more of the several constituents constituting the general mass of garbage without being required by the genus of my invention to also treat the remainder. In other words my invention is designed to economically treat the garbage by means of a continuous method so as to utilize all interchangeable assistance or co-operation, but each of the series of steps in so far as they effectually produce complete results in themselves, constitute independent methods and need not be necessarily associated with the others.

Having described the various steps in the method employed and the construction and operation of the apparatus which I have devised for successfully and economically carrying out the method, what I claim as new, and desire to secure by Letters Patent, is—

1. The method of treating garbage which consists in separating and subjecting to heat the slops material proper and the refuse material, whereby the moisture of the slops material is evaporated and the refuse material is destructively distilled and finally reduced to ashes, and burning the combustible vapors of the slops material and the gases evolved from the refuse material contiguous to the materials operated upon, substantially as and for the purpose set forth.

2. The method of treating garbage which consists in separating and subjecting to heat the slops material proper, and the refuse material, whereby the moisture of the slops material is evaporated and the refuse material is destructively distilled, and finally reduced to ashes, and then commingling the vapors of the slops material and the gases evolved from the refuse material and burning them contiguous to materials operated upon, substantially as hereinbefore set forth.

3. The method of treating garbage which consists in separating and subjecting to heat the slops material proper and the refuse material, whereby the moisture of the slops material is evaporated and the refuse material is destructively distilled, and finally reduced to ashes, commingling the vapors of the slops material and the gases evolved from the refuse material and burning them contiguous to said materials and mixing the unvaporized portion of the slops material and the ashes of the refuse material, substantially as hereinbefore set forth.

4. An apparatus or plant for the treatment and reduction of garbage, consisting of a floating hull or foundation having mounted and secured thereon an adjustable conveyer for elevating the garbage from the dump or scows, a traveling separating apron arranged to receive the garbage from the conveyer, hoppers for receiving the constituents delivered from the separating apron, conveyers for transporting the separated constituents, tanks and digesters to receive and treat the constituents delivered by the conveyers, an incinerating tunnel and fireproof cars for incinerating the waste products delivered thereto, drying troughs and conveyers for evaporating moisture from animal and vegetable matter delivered thereto, wind trunks, water pans and washers communicating with the conveyers for extracting vapors, gases and smoke, exhaust fans connected with the closed conveyers, and flues for producing controlling currents and drafts, oil, solvent and water tanks communicating with the devices supplied by such tanks, substantially as and for the purpose set forth.

5. In combination with a boat and a reduction apparatus situated thereon, an adjustable means for feeding the material to the plant, said feeding device when in use extending over the side of the boat, substantially as hereinbefore set forth.

6. In combination with a boat and a reduction apparatus situated thereon, an incinerating tunnel, suitable conveyers, and an adjustable feeding device for delivering the garbage to the plant, said feeding device when in use extending over the side of the boat as hereinbefore set forth.

7. In combination with a plant for the destruction or utilization of garbage and other refuse matter, of a separating belt or apron arranged to deliver its contents to a suitable element of said plant, substantially as described.

8. A plant for the incineration and reduction of garbage which consists of a boat or floating scow, an incinerating tunnel, reduction tanks and stills and means for elevating or conveying the garbage to be treated to said incinerating tunnel, tanks and stills, substantially as described.

9. The traveling separating apron or belt O, in combination with the hopper Q R and separating blades P, whereby the refuse and slops are automatically delivered to their respective hoppers, substantially as and for the purpose set forth.

10. In combination with the separating apron, the hopper O' divided into compartments and communicating with conveyer chutes P' terminating in inclined deflecting and guiding troughs Q' leading respectively into a series of bottle washers R' whereby the recovered bottles are successively distributed for treatment, substantially as described.

11. The hopper O' formed with compartments to receive respectively rags and tin cans, pieces of iron, &c., such compartments communicating with conveyer troughs and conveyers therein, said troughs leading respectively into washing devices $D^2$ and $B^2$, whereby the said materials are delivered for treatment, substantially as described.

12. The bottle washers R' arranged in a series and communicating by conveyers with a series of compartments in the distributing hopper O', whereby one or more of the washers may be open to receive the bottles, while others may be closed and in use, substantially as described.

13. In combination with the apparatus for the treatment and reduction of garbage, the rag washers $D^2$, the pipe $H^2$ communicating with the interior thereof and terminating in a condenser or water tank $I^2$, the corrugated steam jacket arranged within the washers, a steam supply pipe for furnishing steam to the interior of the washers, and suitable valves for controlling the supply of steam as hereinbefore set forth.

14. In combination with the incinerating tunnel, the jacketed water pan $R^2$ arranged below the arch $V^2$ and provided with inlet and outlet water pipes, substantially as described.

15. In combination with the incinerating tunnel the longitudinal conveyer trough W arranged over the arch above the flue $M^2$, whereby the radiated heat from said arch is utilized to act upon the contents of the trough, substantially as described.

16. In combination with the apparatus for the treatment and reduction of garbage the trough W provided with the double worm conveyers X, adapted to convey and macerate the material contained in the trough, substantially as and for the purpose set forth.

17. In combination with the apparatus for the treatment and reduction of garbage the conveyer trough W extended beyond the tail ends of the conveyers X, and communicating with the transverse trough Y, the longitudinal trough A' and digesters C', substantially as described.

18. In combination with the apparatus for treating and reducing garbage the closed trough W provided with the conveyers X and dams $g'$, $h'$, and suitable water supply and exit pipes, substantially as and for the purpose described.

19. In combination with the apparatus for the treatment and reduction of garbage the closed trough W, provided with the dams $g'$, $h'$, water supply pipe, and the washer $W^2$, substantially as and for the purpose described.

20. In combination with the apparatus for the treatment and reduction of garbage the washer $W^2$ connected with the trough W and communicating by a conduit pipe with the ash hopper S, substantially as described.

21. In combination with the trough W and ash hopper S the washer $W^2$ communicating with the ash hopper S and provided with the fume conduit pipe $k'$ in combination with the exhaust $S^2$, the flue $M^2$ of the incinerating tunnel, and a conduit between the exhaust $S^2$ and tunnel flue, whereby the liberated fumes are conducted into the tunnel, substantially as described.

22. In combination with the apparatus for the treatment and reduction of garbage the hopper S and trough W the washer $W^2$ communicating with the ash hopper S and provided with the fume conduit pipe $k'$, and a suitable exhaust, substantially as described.

23. In combination with the exit end of the tunnel, a hollow ash remover secured in position over the path of travel of the cars and extending slightly into the tunnel and adapted to remove the ashes from the cars, substantially as described.

24. In combination with the exit end of the incinerating tunnel, the hollow ash remover Z' projecting slightly within the tunnel and over the path of travel of the cars, and provided with the vertical space $z$, substantially as and for the purpose set forth.

25. The ash remover Z' of triangular form and constructed with the horizontal and vertical spaces $y$, $z$, whereby the ashes forced into the remover by the movement of the cars is deflected into the vertical space or conduit $z$, substantially as and for the purpose set forth.

26. In combination with the apparatus for the treatment and reduction of garbage, the hopper S, conveyer T, crusher U, conveyer $f'$, bins V and H', conveyers I' and pulverizer M', substantially as and for the purpose described.

27. In combination with the apparatus for treating and reducing garbage the hopper S provided with the spout $e'$ and conveyer T, and the crushing device U, substantially as described.

28. In combination with the apparatus for the treatment and reduction of garbage the hopper S provided with the spout $e'$ and conveyer T, the crushing device U, conveyer $f'$ and bin V, substantially as set forth.

29. In combination with the apparatus for the treatment and reduction of garbage the bin V provided with the spout K' and charger I', the bin H' provided with spout K' and charger I', the chute L' and a suitable grinding or pulverizing device M', whereby the fertilized ash and dried and digested slop residuum may be mixed and ground, substantially as hereinbefore set forth.

30. In combination with the apparatus for the treatment and reduction of garbage, the grinding and pulverizing device M' and the adjustable spout or trough N', substantially as and for the purpose set forth.

31. The flue $M^2$ of the incinerating tunnel communicating laterally with the housing $N^2$ through passages $O^2$, in combination with a series of boilers mounted in the housing, and with one or more flues $Y^2$ in the breeching communicating with the exhaust exit, whereby the heat is utilized to generate steam in any one or more sets of boilers, substantially as described.

32. The flue $M^2$ of the incinerating tunnel communicating through a series of damper controlled passages $O^2$ into the housing $N^2$, a series of boilers mounted in the housing $N^2$, a series of damper controlled passages $Y^2$ in the breeching, and communicating with the exhaust exit, whereby the otherwise waste heat may be utilized to generate steam alternately in one or more of the sets of boilers, as hereinbefore set forth.

33. In combination with the flues $Y^2$ in the breeching, of the housing $N^2$, the closed washer $P^2$ located between the flues $Y^2$ and the exhaust exit and supplied with running and falling water, substantially as described.

34. In combination with the apparatus for the treatment and reduction of garbage the series of digesters C' arranged beneath the gated delivery trough A', a series of solvent tanks $c^2$ arranged above the digesters C', a series of solvent evaporators and separators $y'$, valve controlled communicating pipes between the tops of the digesters and the tops of the solvent tanks $c^2$ and separators and evaporators $y'$, valve controlled pipes $u'$ communicating between the bottoms of the solvent tanks and the bottoms of the digesters C', valve controlled communicating pipes between the bottoms of the digesters C' and separators and evaporators $y'$, a steam pipe communicating with the series of digesters C' and separators and evaporators $y'$, suitable pet cocks in the digesters and separators and evaporators, and suitable closed man-holes in the digesters, all substantially as and for the purposes hereinbefore set forth.

35. In combination with the apparatus for the treatment and reduction of garbage, the series of digesters, solvent tanks, and evaporators and separators, the conveyer trough D' adapted to receive the tankage from the digesters C', and the transverse conveyer trough F' and bin or receptacle H' whereby the tankage is deposited in proximity to the ash bin V, substantially as and for the purpose set forth.

36. In combination with the apparatus for the treatment and reduction of garbage the separators and evaporators $y'$ communicating with the solvent tanks and digesters and steam supply pipe, and provided with a double open and closed flighted conveyer and evaporator $z'$, whereby the greases flow helically toward the bottom while at the same time under the influence of heat the solvent is evaporated and rises through the pipe $b^2$ and is returned to the solvent tanks $c^2$, substantially as and for the purposes set forth.

37. In combination with the apparatus for the treatment and reduction of garbage the solvent tanks and condensers $c^2$ communicating with the digesters C' and evaporators and separators $y'$ and provided with continuous open and closed flighted water conveyers $d^2$, substantially as and for the purpose set forth.

38. In combination with the apparatus for the treatment and reduction of garbage the solvent tanks and condensers $c^2$ communicating with each other and also with the digesters over which they are respectively located, and provided with a continuous water condenser, passing through the series of solvent tanks, whereby the entire supply of solvent is available independently of the number of digesters in use, and whereby also the condensing influences of the continuous condenser is availed of, as hereinbefore set forth.

39. In combination with the apparatus for the treatment and reduction of garbage the series of tanks and condensers $c^2$ provided with the helical water condensers $d^2$, the water tank $B^3$ and suitable connections therewith, whereby the water condensers $d^2$ are continuously supplied by gravity with water, as hereinbefore set forth.

40. In combination with the boat or foundation A and the apparatus thereon for the treatment and reduction of garbage the capstans $C^3$ located at each end of the boat, the endless wire rope $D^3$, the concave winding drum $E^3$ mounted upon the shaft $H^3$, the guiding sheaves or pulleys F, and suitable means for rotating the shaft $H^3$ whereby a slow continuous movement is imparted to the rope $D^3$, substantially as and for the purpose set forth.

41. In combination with the incinerating tunnel the means for transporting the empty cars laterally to and in alignment with the front or initial end of the tunnel $V^2$, consisting of the platform $Q^3$ mounted on trucks $R^3$, resting upon hanger rails $S^3$ secured to the deck beams, in combination with the endless rope $N^3$, drum $M^3$, sheaves $O^3$, $P^3$, and the grip device consisting of the yoke $U^3$, handle bar $V^3$, rock shaft $X^3$ and blocks or plates $Y^3$, $Z^3$, substantially as shown and described.

42. In combination with the incinerating tunnel the side "transfer" at the forward end of the tunnel and the similar "transfer" at the rear or exit end of the tunnel and the cars provided with the shoulder $I^4$, the track rails $A^4$, the continuous chain $B^4$, provided with spurs $H^4$, and passing around the idler at the rear end of the plant and around the sprocket $C^4$ on the shaft $E^4$ mounted upon the drum frame $I^3$, and means for rotating the shaft $E^4$, substantially as hereinbefore described.

43. In combination with the incinerating tunnel the side transfer $Q^3$ at the front end of the tunnel, the endless chain $U^4$ passing around the sprocket $T^4$ and idler $V^4$, and provided with spur $H^4$ and means for rotating the sprocket $T^4$ whereby the car on the side transfer is pushed into the tunnel, substantially as described.

44. In combination with the incinerating tunnel the floating support A having the steel ribs C sheathed to constitute the hull, braced and tied by the channel beams E and provided with the longitudinal bulk-head composed of vertical studs D, forming a rigid support for the open frame-work upon which the tunnel is erected, substantially as described.

In testimony whereof I affix my signature in presence of two witnesses.

JAMES C. ANDERSON.

Witnesses:
N. CURTIS LAMMOND,
WM. C. MCINTIRE.